United States Patent
Lu

(10) Patent No.: US 12,051,171 B2
(45) Date of Patent: Jul. 30, 2024

(54) SYSTEM AND METHOD OF GENERATING PROJECTION IMAGE WITH REGION OF INTEREST

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 242 days.

(21) Appl. No.: 17/833,497

(22) Filed: Jun. 6, 2022

(65) Prior Publication Data
US 2023/0394622 A1 Dec. 7, 2023

(51) Int. Cl.
| | |
|---|---|
| G06T 3/20 | (2006.01) |
| G06T 3/047 | (2024.01) |
| G06T 3/18 | (2024.01) |
| G06T 7/40 | (2017.01) |
| G06T 7/70 | (2017.01) |
| G06V 10/10 | (2022.01) |
| G06V 10/25 | (2022.01) |
| G06V 10/70 | (2022.01) |
| G06V 40/16 | (2022.01) |
| H04N 23/698 | (2023.01) |

(52) U.S. Cl.
CPC .............. *G06T 3/20* (2013.01); *G06T 3/047* (2024.01); *G06T 3/18* (2024.01); *G06T 7/40* (2013.01); *G06T 7/70* (2017.01); *G06V 10/16* (2022.01); *G06V 10/25* (2022.01); *G06V 10/70* (2022.01); *G06V 40/161* (2022.01); *H04N 23/698* (2023.01); *G06T 2207/20021* (2013.01); *G06T 2207/20068* (2013.01); *G06T 2207/30201* (2013.01)

(58) Field of Classification Search
CPC .. G06T 3/20; G06T 3/047; G06T 3/18; G06T 7/40; G06T 7/70; G06T 2207/20021; G06T 2207/20068; G06T 2207/30201; G06T 3/4038; G06V 10/16; G06V 10/25; G06V 10/70; G06V 40/16; G06V 10/82; G06V 20/64; G06V 40/168; H04N 23/698

See application file for complete search history.

(56) References Cited

U.S. PATENT DOCUMENTS 10,104,288 B2 10/2018 Hung et al.
10,810,700 B2 10/2020 Lu
(Continued)

*Primary Examiner* — Kyu Chae
(74) *Attorney, Agent, or Firm* — Muncy, Geissler, Olds & Lowe, P.C.

(57) ABSTRACT

An image processing system is disclosed, comprising a multiple-lens camera, a vertex list generator and an image processing apparatus. The multiple-lens camera captures a X-degree horizontal field of view (FOV) and a Y-degree vertical FOV to generate multiple lens images, where X<=360, Y<=180. The vertex list generator generates a first main vertex list according to a correspondence table, and generates a first region of interest (ROI) vertex list according to the first main vertex list and a position information of the ROI when the ROI overlaps at least one measuring region inside an overlap region in a projection image. The image processing apparatus generates the projection image according to the multiple lens images and a second main vertex list related to first main vertex list in a rendering mode.

26 Claims, 15 Drawing Sheets

(56) References Cited

U.S. PATENT DOCUMENTS

| | | | |
|---|---|---|---|
| 2015/0170559 A1* | 6/2015 | Ouchi | G09G 3/002 |
| | | | 345/1.3 |
| 2018/0018807 A1 | 1/2018 | Lu et al. | |
| 2018/0205889 A1* | 7/2018 | Abbas | H04N 23/698 |
| 2019/0082103 A1* | 3/2019 | Banerjee | G06T 7/50 |

* cited by examiner polygon mesh on equirectangular domain

Triangle mesh modeling a sphere

SYSTEM AND METHOD OF GENERATING PROJECTION IMAGE WITH REGION OF INTEREST

BACKGROUND OF THE INVENTION

Field of the Invention

The invention relates to image processing, and more particularly, to a system and method of generating a projection image with region of interest (ROI).

Description of the Related Art

A multiple-lens camera captures a view with a 360-degree horizontal field of view (FOV) and up to a 180-degree vertical FOV. For example, as shown in FIG. 1A, a conventional multiple-lens camera includes four lens respectively mounted on four faces (right, left, front, back) of a cube framework 11. Any two adjacent faces of the four faces are substantially orthogonal, such as facing toward 0°, 90°, 180°, 270° of longitude of the virtual sphere 12, respectively, to simultaneously capture a view with a 360-degree horizontal FOV and a 90-degree vertical FOV to generate four lens images. Referring to FIG. 1B, pixels in regions A(1)~A(4) are overlapping by two adjacent lens/texture images while pixels in regions 15 comes from a single lens/texture image. Stitching operations over the overlap regions A(1)~A(4) are performed to form a panoramic image.

A conventional stitching method for generating panoramic images disclosed in U.S. Pat. No. 10,810,700 B2 (the disclosure of which is incorporated herein by reference in its entirety) aims to minimize the mismatch image defect caused by a shifted lens center of an image capture module, e.g., a lens center 46 of an image capture module 21 is separated from the system center 43 by an offset ofs in FIG. 4C. However, the conventional stitching method suffers from a visible defect in a panoramic image when a human face is present around an overlap region A(2) together with a potted plant as shown in FIG. 1B. If the human face is a far object and the potted plant is a near object, the potted plant lacking a portion and two overlapping human faces are likely shown in the overlap region A(2) of the panoramic image. If the human face is a near object and the potted plant is a far object, two overlapping pots and the human face lacking a portion are likely shown in the overlap region A(2) of the panoramic image. It is hereinafter called "overlapping/lacking (OL) phenomenon." Accordingly, what is needed is a new image processing system and method to improve image quality under the OL phenomenon.

SUMMARY OF THE INVENTION

In view of the above-mentioned problems, an object of the invention is to provide an image processing system capable of avoiding the OL phenomenon and improving image quality if an ROI overlaps at least one measuring region in an overlap region.

One embodiment of the invention provides an image processing system. The image processing system comprises a multiple-lens camera, a vertex list generator, a stitching decision device and an image processing apparatus. The multiple-lens camera captures a X-degree horizontal field of view (FOV) and a Y-degree vertical FOV to generate multiple lens images, where X<=360, Y<=180. The vertex list generator is configured to perform first operations comprising: (a) generating a first main vertex list according to a correspondence table; and (b) generating a first region of interest (ROI) vertex list according to the first main vertex list and a position information of a ROI when the ROI overlaps at least one measuring region inside an overlap region in a projection image. The image processing apparatus is configured to generate the projection image according to the multiple lens images and a second main vertex list related to the first main vertex list in a rendering mode. Here, the first main vertex list comprises first vertices forming a polygon mesh modeling the projection image, and the first ROI vertex list comprises second vertices forming a transverse segment associated with an intersection between the ROI and the at least one measuring region.

Another embodiment of the invention provides image processing method, applied to an image processing system comprising a multiple-lens camera that captures a X-degree horizontal field of view (FOV) and a Y-degree vertical FOV to generate multiple lens images, where X<=360, Y<=180. The method comprises obtaining a first main vertex list according to a correspondence table; obtaining a first region of interest (ROI) vertex list according to the first main vertex list and a position information of a ROI when the ROI overlaps at least one measuring region inside an overlap region in a projection image; and, generating the projection image according to the multiple lens images and a second main vertex list related to the first main vertex list. Here, the first main vertex list comprises first vertices forming a polygon mesh modeling the projection image, and the first ROI vertex list comprises second vertices forming a transverse segment associated with an intersection between the ROI and the at least one measuring region.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1B:
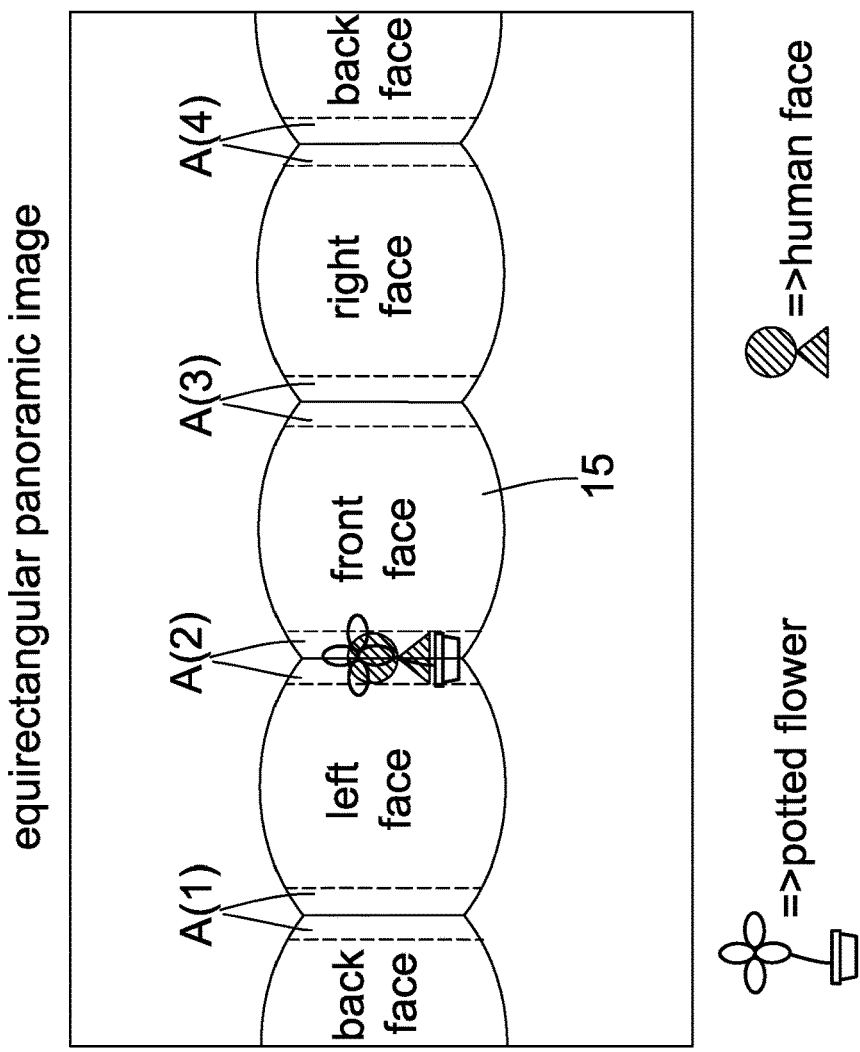
FIG. 1B shows an equirectangular panoramic image derived from an equirectangular projection of four-lens images (right, left, front, back), and suffering from the OL phenomenon in the overlap region A(2).

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

Figure 5A:
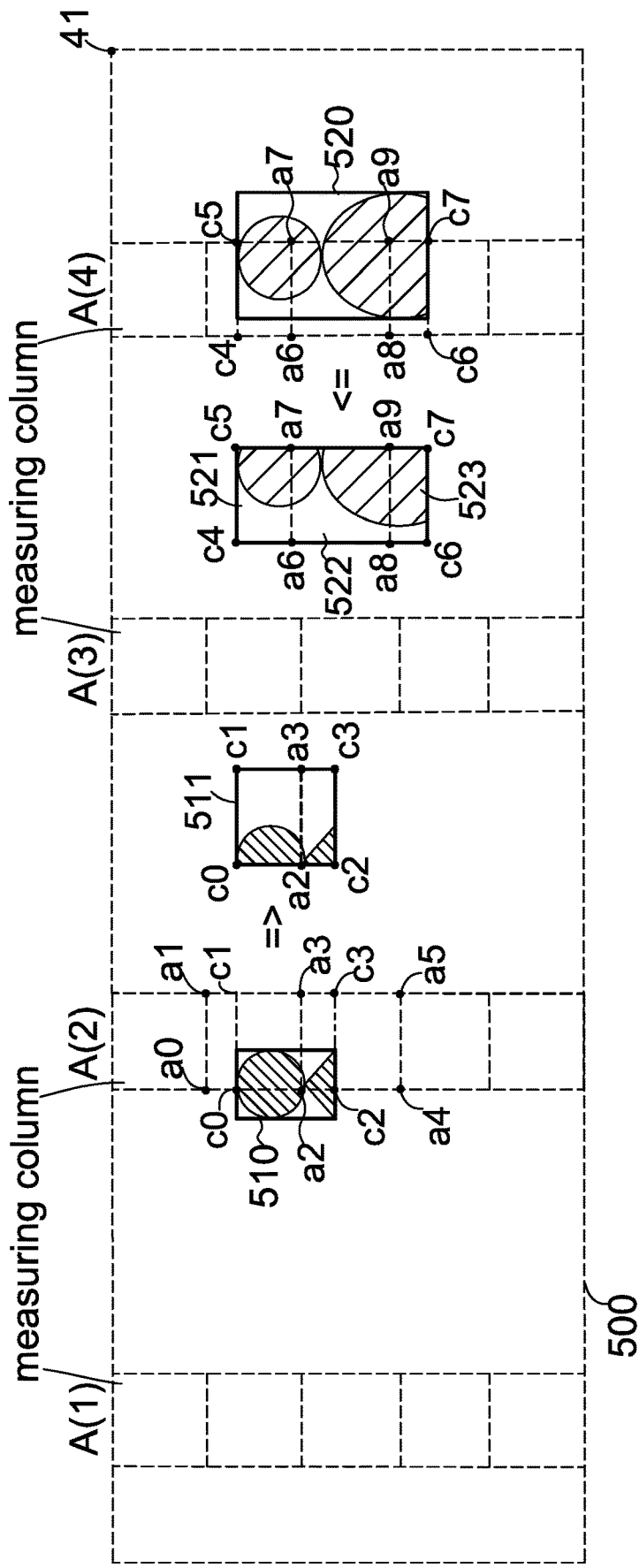
FIG. 5A is an example showing two detected ROIs 510 and 520 respectively overlap the overlap regions A(2) and A(4) in the equirectangular panoramic image 500.

A feature of the invention is to replace a temporary warping coefficient of a selected control point inside a first measuring region with a temporary warping coefficient of a transverse segment when the transverse segment (related to a detected ROI by an AI module 25 as shown in FIG. 5A) either overlaps the first measuring region or occupies more than a half of a second measuring region adjacent to the first measuring region. Thus, the invention can avoid the OL phenomenon and significantly improves image quality.

Figure 2:
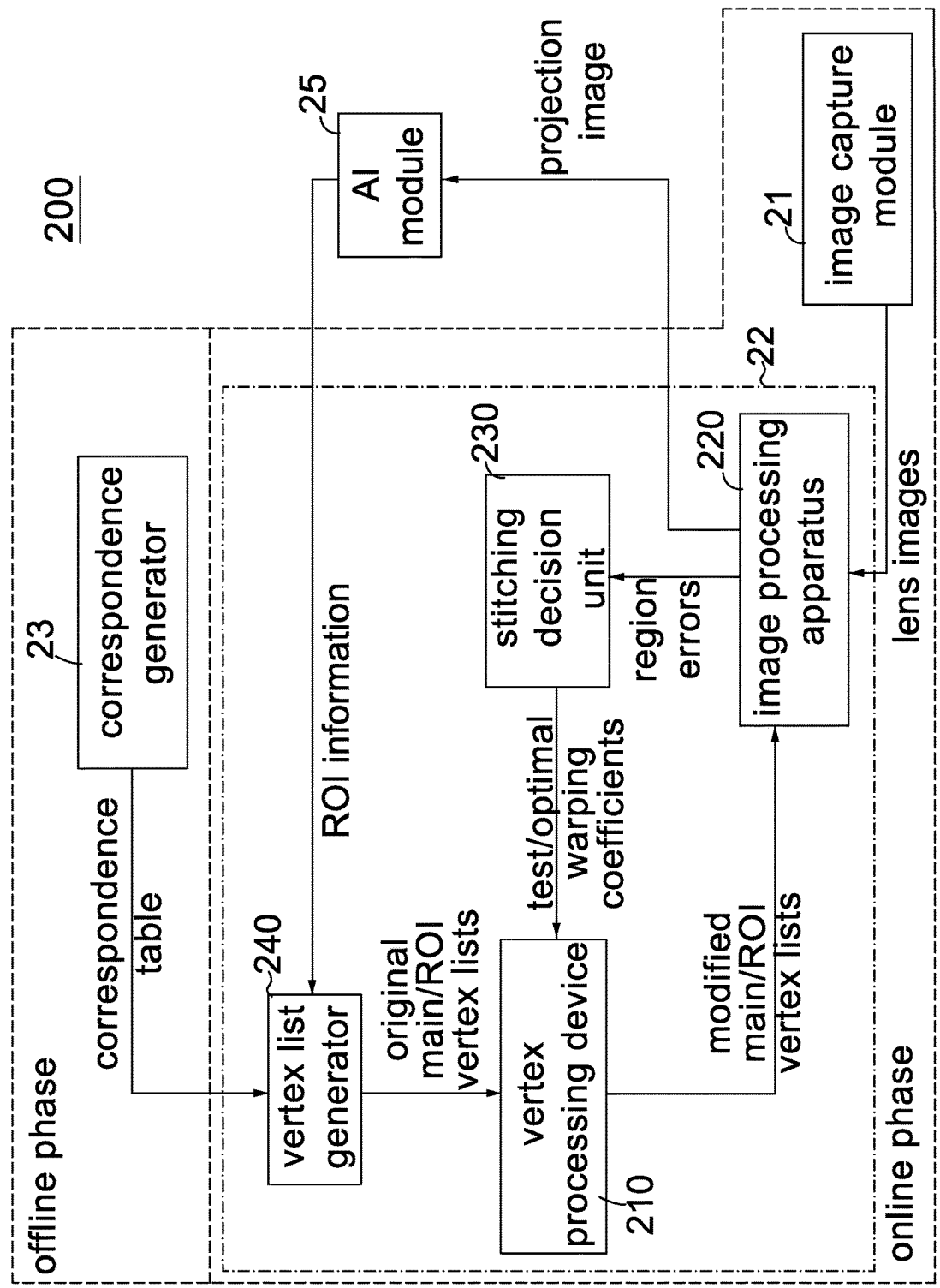
FIG. 2 is a block diagram showing a projection image processing system according to an embodiment of the invention.

FIG. 2 is a block diagram showing a projection image processing system according to an embodiment of the invention. Referring to FIG. 2, the projection image processing system 200 includes an image capture module 21, a compensation device 22, a correspondence generator 23 and an artificial intelligence (AI) module 25. The compensation device 22 includes a vertex processing device 210, an image processing apparatus 220, a stitching decision unit 230 and a vertex list generator 240. The compensation device 22 receives correspondence table from the correspondence generator 23 and multiple lens images from the image capture module 21 and generates a projection image, such as a panoramic image or a wide-angle image.

Figure 1A:
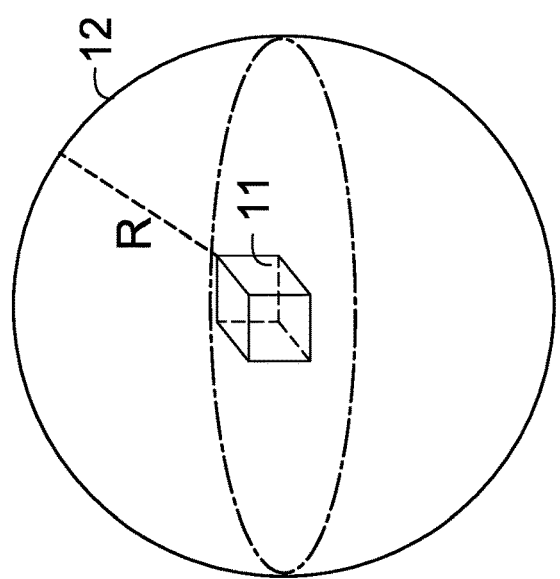
FIG. 1A shows a relation between a cube framework and a sphere.

The image capture module 21 is a multiple-lens camera, which is capable of simultaneously capturing a view with a X-degree horizontal FOV and a Y-degree vertical FOV to generate a plurality of lens images, where $X \leq 360$ and $Y \leq 180$. For example, as shown in FIG. 1A, the image capture module 21 includes four lenses (not shown) respectively mounted on the four faces of a cube framework 11 to simultaneously capture a view of the world with 360-degree horizontal FOV and 90-degree vertical FOV to generate four lens images. Please note that the number of the lenses is not limited as long as it is sufficient for the lenses to capture a view with a X-degree horizontal FOV and a Y-degree vertical FOV, where $X \leq 360$ and $Y \leq 180$. A requirement is that there should be sufficient overlaps between the views of any two adjacent lenses to facilitate image mosaicking.

Throughout the specification and claims, the following terms take the meanings explicitly associated herein, unless the context clearly dictates otherwise. The term "texture coordinates" refers to coordinates in a texture space (such as a lens/texture image). The term "destination coordinates" refers to coordinates in a destination space (such as a projection image). The term "rasterization" refers to a process of computing the mapping from scene geometry (or a projection image) to texture coordinates of each lens image.

A wide variety of projections are suitable for use in the projection image processing system 200 of the invention. The term "projection" refers to flatten a globe's surface into a 2D plane, e.g., a projection image. The projection includes, without limitations, equirectangular projection, cylindrical projection and modified cylindrical projection. The modified cylindrical projection includes, without limitations, Miller projection, Mercator projection, Lambert cylindrical equal area projection and Pannini projection. Thus, the projection image includes, without limitations, an equirectangular panoramic image, a cylindrical projection image and a modified cylindrical projection image. FIGS. 1A-1B, 3A-3B, 4A-4C and 5A are associated with equirectangular projection. The implementations of the cylindrical projection and the modified cylindrical projection are well known to those skilled in the art and thus will not be described herein. Please note that whichever projection is used in the projection image processing system 200, the correspondence generator 23 would correspondingly generate a correspondence table (will be described below) that define the vertex mapping between the lens images and the projection image. For purpose of clarity and ease of description, the following examples and embodiments are described with reference to equirectangular projection and with the assumption that the image capture module 21 is a four-lens camera and the projection image is an equirectangular panoramic image. The operations of the projection image processing system 200 and the image processing method (FIGS. 6A-6E) are also applicable to a wide-angle camera, the cylindrical projection and the modified cylindrical projection.

The processing pipeline for the projection image processing system 200 is divided into an offline phase and an online phase. In the offline phase, the four lenses of the image capture module 21 are calibrated separately. For example, the sphere 12 with 2-meter radius (R=2) is drawn in many circles as latitude and longitude, whose intersection points are treated as calibration points. The four lenses capture these calibration points, and their positions on lens images are known. Then the mapping relationship between the equirectangular panoramic image and lens images are constructed since the view angles of the calibration points and texture coordinates are linked. A calibration point with the mapping relationship is defined as a "vertex" in this invention. After calibration, the correspondence generator 23 generates a correspondence table having multiple vertices, where each vertex provides the mapping between its equirectangular coordinates (longitude, latitude) and its texture coordinates in all lens images. The correspondence generator 23 completes all necessary computations in the offline phase.

According to the correspondence table, the vertex list generator 240 adopts appropriate image registration techniques to generate an original main vertex list (e.g., Table 1), and each vertex in an original main vertex list provides the vertex mapping between the equirectangular panoramic image and the lens images (or between the equirectangular coordinates and the texture coordinates). The original main vertex list is a list of a plurality of vertices forming a plurality of quadrilaterals and/or triangles of the polygon mesh (FIG. 3B) and each vertex is defined by its corresponding data structure. The data structure defines a vertex mapping between a destination space and a texture space (or between the equirectangular coordinates and the texture coordinates). Table 1 shows an exemplary data structure of each vertex in the original main vertex list.

TABLE 1

| Attributes | Descriptions |
| --- | --- |
| (x, y) | Equirectangular coordinates |
| N | Number of covering/overlapping lens images |
| $ID_1$ | ID of first lens image |
| $(u_1, v_1)$ | Texture coordinates in first lens image |
| $(idx_{10}, idx_{11})$ | Warping coefficient indices in first lens image |
| $Alpha_1$ | Blending weight for warping coefficients in first lens image |
| $w_1$ | Blending weight for stitching in first lens image |
| ... | ... |
| $ID_N$ | ID of $N^{th}$ lens image |
| $(u_N, v_N)$ | Texture coordinates in $N^{th}$ lens image |
| $(idx_{N0}, idx_{N1})$ | Warping coefficient indices in $N^{th}$ lens image |
| $Alpha_N$ | Blending weight for warping coefficients in $N^{th}$ lens image |
| $w_N$ | Blending weight for stitching in $N^{th}$ lens image |

Figure 3B:
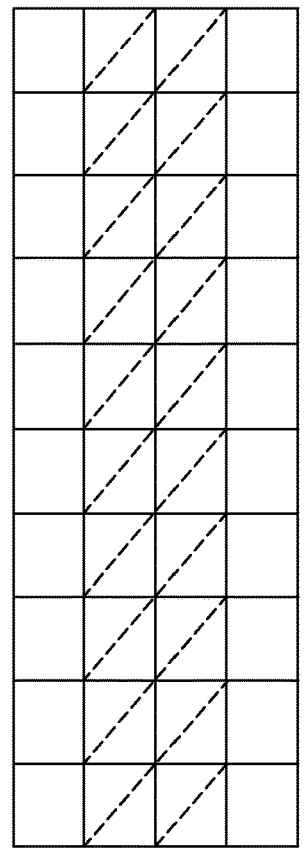
FIG. 3B shows a polygon mesh composing/modeling the equirectangular panoramic image.
Figure 3A:
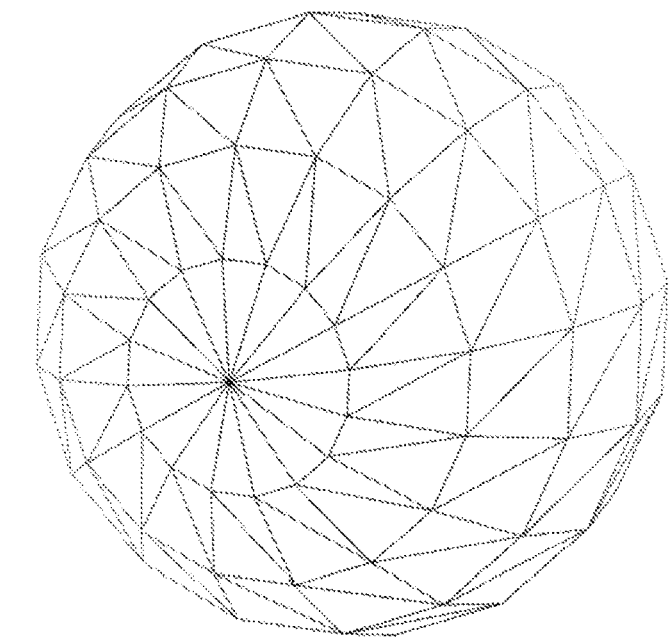
FIG. 3A shows a triangle mesh modeling a sphere surface.
Figure 4A:
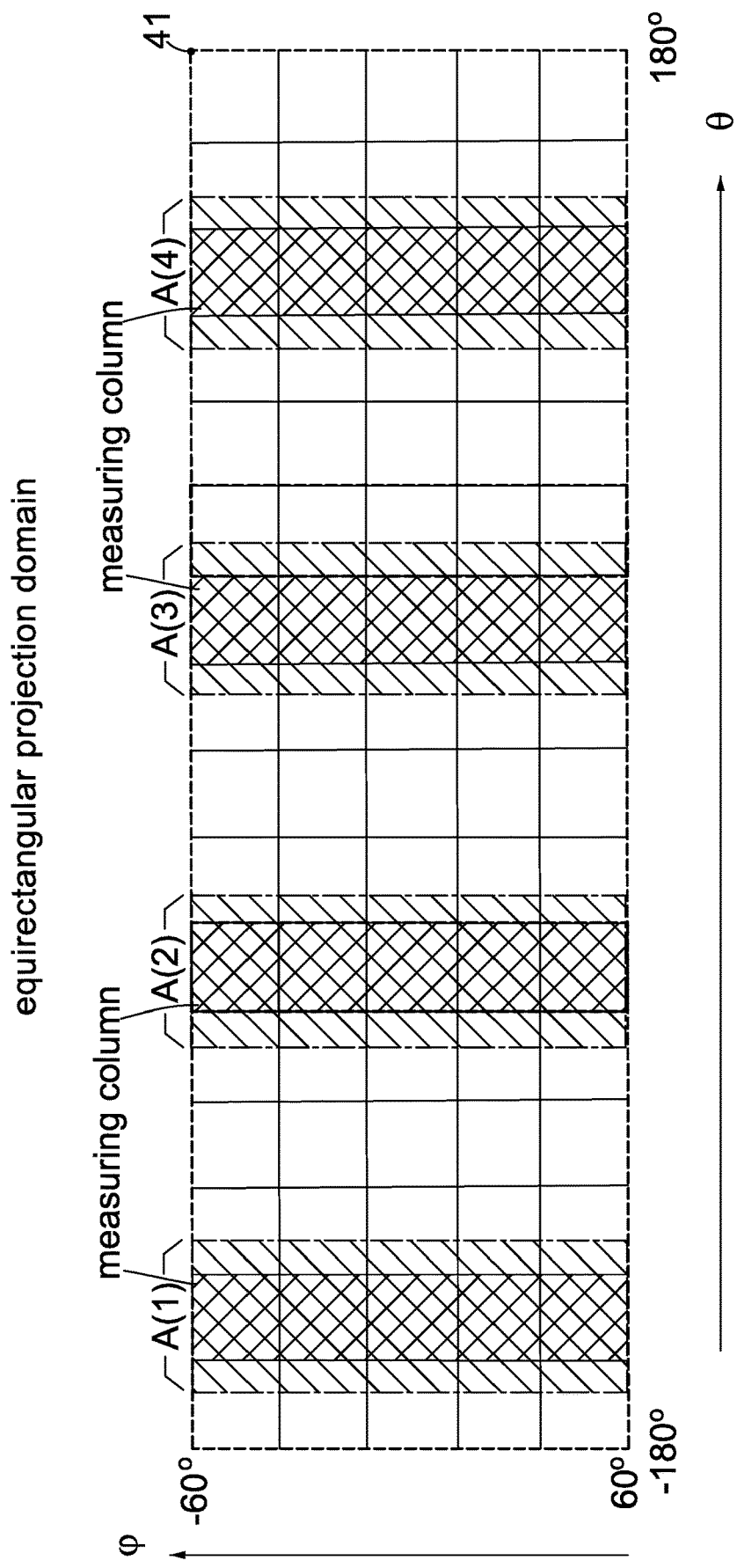
FIG. 4A is a diagram showing an example grid modeling an equirectangular panoramic image.

FIG. 3A shows a triangle mesh modeling a sphere surface. The surface of the sphere 12 is modeled by using a triangle mesh as shown in FIG. 3A. FIG. 3B shows a polygon mesh composing/modeling the equirectangular panoramic image. The polygon mesh of FIG. 3B is produced by performing an equirectangular projection of the triangle mesh of FIG. 3A. The polygon mesh in FIG. 3B is a collection of quadrilaterals and/or triangles. FIG. 4A is a diagram showing an example grid modeling an equirectangular panoramic image. Referring to FIG. 4A, the grid can be visualized as a rectangular structure with five rows and sixteen columns of quadrilaterals in an equirectangular panoramic image. The example grid in FIG. 4A correspond to the polygon mesh in FIG. 3B and thus the vertices/intersection 41 of the grid in FIG. 4A correspond to the vertices of the polygon mesh in FIG. 3B. The horizontal spacing between any two neighboring vertices in horizontal axis is equal and the vertical spacing between any two neighboring vertices in vertical axis is equal in the equirectangular coordinate system. Horizontal and vertical axes in FIG. 4A refer to θ and φ for longitude and latitude. In the example of FIG. 4A, it is assumed that the four lenses of the image capture module 21 are capable of simultaneously capturing a view with a 360-degree horizontal FOV and a 120-degree vertical FOV to generate four lens images that forms the equirectangular panoramic image.

Figure 4B:
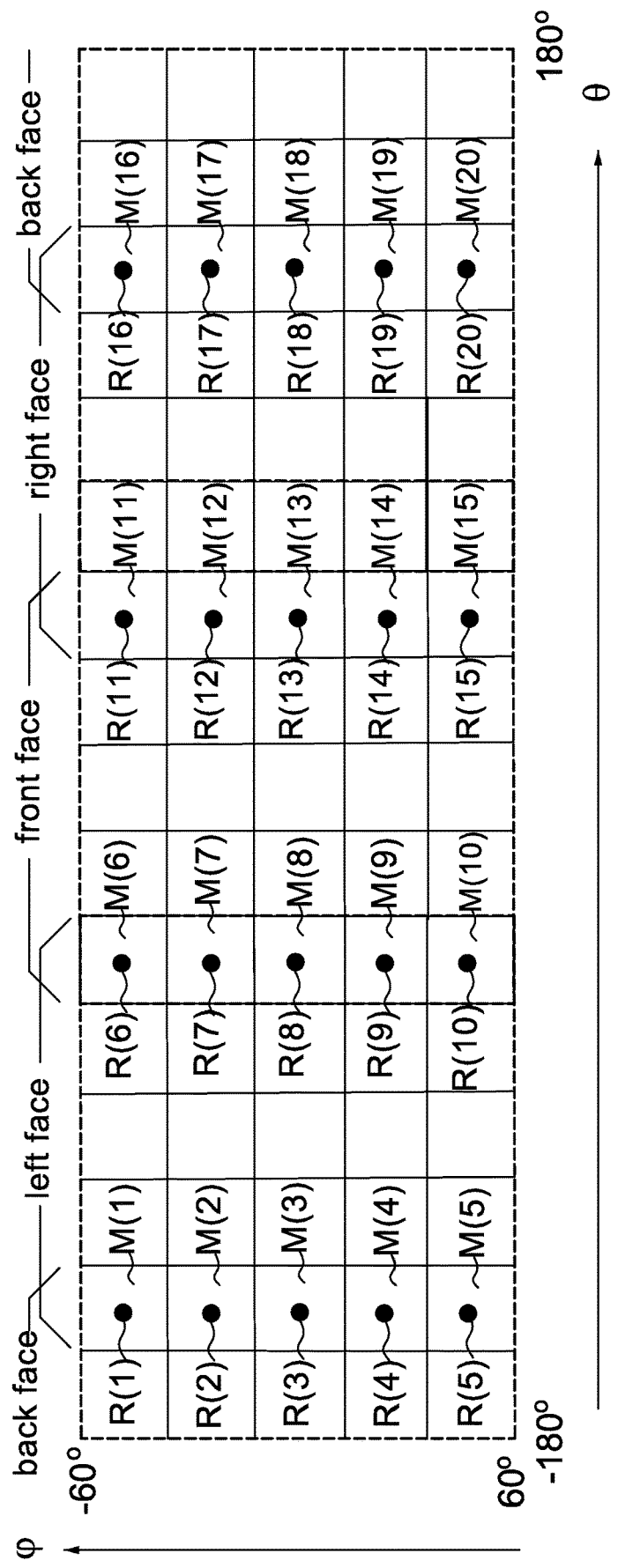
FIG. 4B is an example showing twenty control points R(1)~R(20) and twenty measuring regions M(1)~M(20) in the equirectangular panoramic image related to FIG. 4A with five (P1=5) control points in each measuring column.

According to the invention, each overlap region in the projection image contains P1 control points in a column, where P1>=3. The sizes of the overlap regions are varied according to the FOVs of the lenses, the resolutions of lens sensors and the lens angles arranged in the image capture module 21. Normally, the width of each overlap region is greater than or equal to a multiple of the width of one column of quadrilaterals in the projection image. If there are multiple columns of quadrilaterals located inside each overlap region, only one column of quadrilaterals (hereinafter called "measuring column") inside each overlap region is pre-determined for accommodating P1 control points. In the example of FIG. 4A, there are four overlap regions A(1)~A(4), and only one column of quadrilaterals is located inside each overlap region and directly defined as the measuring column for accommodating the P1 control points. For each measuring column, the top and the bottom control points are respectively placed at the centers of the top and the bottom quadrilaterals, then the other (P1-2) control points are evenly distributed between the top and the bottom control points. Measuring regions (for measuring region errors in measure mode) are defined as follows: for the quadrilateral i in each measuring column in each overlap region, search for a control point j closest to the quadrilateral i and categorize the quadrilateral i as the measuring region j corresponding to the control point j, where 1=<i<=n1, 1=<j=<P1 and n1 denotes the number of quadrilaterals in each measuring column. FIG. 4B is an example showing twenty control points R(1)~R(20) and twenty measuring regions M(1)~M(20) in the equirectangular panoramic image related to FIG. 4A with five (P1=5) control points in each measuring column. The twenty control points R(1)~R(20) located in twenty measuring regions M(1)~M(20) in FIG. 4B respectively have twenty optimal warping coefficients C(1)~C(20) in rendering mode. The optimal warping coefficients C(1)~C(20) respectively denote different warping degrees for the control points R(1)~R(20).

In the online phase, the projection image processing system 200 operates in a measure mode or a rendering mode. In a measure mode, the vertex list generator 240 generates an original main vertex list according to the correspondence table and generates an original ROI vertex list for at least one transverse segment according to ROI information from the AI module 25 and the original main vertex list (will be described below); the vertex processing device 210 receives the original main and the original ROI vertex lists, twenty test warping coefficients $C_t(1)$~$C_t(20)$ from the stitching decision unit 530, modifies all the texture coordinates of all lens images for each vertex from the original main and the original ROI vertex lists on a vertex-by-vertex basis and generates a modified main vertex list (e.g., Table 2) and a modified ROI vertex list; according to the modified main and the modified ROI vertex lists and four lens images from the image capture module 21, the image processing apparatus 220 measures region errors of twenty measuring regions M(1)~M(20) and the at least one transverse segment in the equirectangular panoramic image, and outputs all the region errors. Accordingly, the stitching decision unit 230 sets the values of the test warping coefficients $C_t(1)$~$C_t(20)$ based on an offset ofs (see FIG. 4C), and then receives all the region errors to form a 2D main error table and a 2D ROI error table; afterward, according to the 2D main and the 2D ROI error tables, the stitching decision unit 230 generates twenty optimal warping coefficients C(1)~C(20) for the twenty control points R(1)~R(20) (see descriptions of FIGS. 6A-6E). On the other hand, in the rendering mode, the stitching decision unit 230 and the vertex list generator 240 are disabled; thus, the vertex processing device 210 and the image processing apparatus 220 operate together to generate equirectangular panoramic images based on four lens images from the image capture module 21 and the twenty optimal warping coefficients C(1)~C(20). The detailed operations of the vertex processing device 210 and the image processing apparatus 220 that operate to generate the equirectangular panoramic images in rendering mode are disclosed in U.S. patent application Ser. Nos. 17/564,985 and 15/211,732, U.S. Pat. Nos. 10,104,288 B2 and 10,810, 700 B2 (the disclosures of which are incorporated herein by reference in their entirety).

Figure 4C:
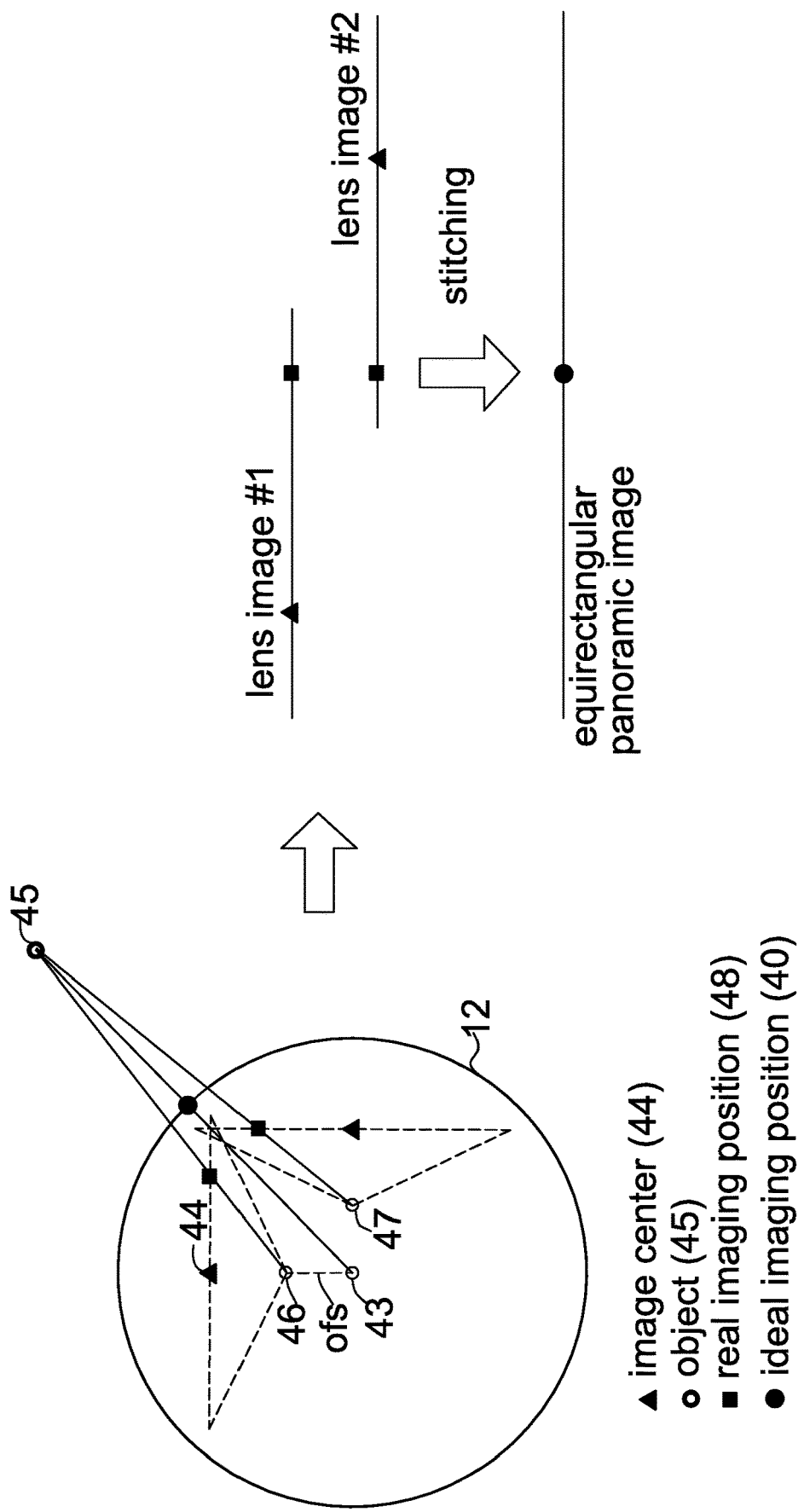
FIG. 4C shows a mismatch image defect caused by an offset ofs (that a lens center 46 is separated from the camera system center 43) is improved after all the texture coordinates of all vertices are modified by the vertex processing device 210 according to the optimal warping coefficients C(1)~C(20).

FIG. 4C shows a mismatch image defect caused by an offset ofs (that a lens center 46 is separated from the camera system center 43) is improved after all the texture coordinates of all vertices are modified by the vertex processing device 210 according to the optimal warping coefficients C(1)~C(20). In an ideal case, the lens centers 46/47 of the four lenses in the image capture module 21 are simultaneously located at the camera system center 43 of the framework 11 (not shown), so a single ideal imaging point 40 derived from a far object 45 is located on an image plane 12 with 2-meter radius (R=2). Since the ideal imaging position 40 in the lens image #1 matches the ideal image position 40 in the lens image #2, a perfect stitching/blending result is produced in the equirectangular panoramic image after an image stitching/blending process is completed. However, in real cases, the lens centers 46~47 for lenses #1 and #2 are separated from the system center 43 by an offset ofs as shown in left portion of FIG. 4C, so a mismatch image defect would be clearly shown in the equirectangular panoramic image.

In rendering mode, the vertex processing device 210 sequentially modifies all the texture coordinates in each lens image for each vertex from an original main vertex list according to twenty optimal warping coefficients C(1)~C(20) to generate a modified main vertex list; in measuring mode, the vertex processing device 210 sequentially modifies all the texture coordinates in each lens image for each vertex from an original main vertex list and an original ROI vertex list according to twenty test warping coefficients $C_t(1)$~$C_t(20)$ to generate a modified main vertex list and a modified ROI vertex list. The detailed operations of the vertex processing device 210 in measuring mode or rendering mode are disclosed in U.S. patent application Ser. Nos. 17/347,981 and 17/564,985 and U.S. Pat. No. 10,810,70062 (the disclosures of which are incorporated herein by reference in their entirety). Table 2 shows an exemplary data structure of each vertex in the modified main vertex list.

TABLE 2

| Attributes | Descriptions |
| --- | --- |
| (x, y) | Equirectangular coordinates |
| N | Number of covering/overlapping lens images |
| $ID^1$ | ID of first lens image |
| $(u'_1, v'_1)$ | Modified texture coordinates in first lens image |
| $w_1$ | Blending weight for stitching in first lens image |
| ... | ... |
| $ID_N$ | ID of $N^{th}$ lens image |
| $(u'_N, v'_N)$ | Modified texture coordinates in $N^{th}$ lens image |
| $w_N$ | Blending weight for stitching in $N^{th}$ lens image |

After all the texture coordinates of all vertices from the original main and the original ROI vertex lists are modified according to test/optimal warping coefficients ($C_t(1)$~$C_t(20)$ or C(1)~C(20)) by the vertex processing device 210, the mismatch image defects caused by shifted lens centers of the image capture module 21 (e.g., a lens center 46 is separated from the system center 43 by an offset ofs) would be greatly improved (i.e., the real imaging positions 48 are pulled toward the idea imaging positions 40) as shown in FIG. 4C. Please note that since the sphere 12 is virtual, the object may be located outside, inside the sphere 12 or on the surface of the sphere 12. Please also note that the data structures of the vertices in the original ROI vertex list and the modified ROI vertex list are similar to those of the original and the modified main vertex list (e.g., Table 1 and Table 2), but exclude the "Blending weight for stitching in $i^{th}$ lens image ($w_i$)" field.

After system initialization, the projection image processing system 200 need to operate in measure mode and rendering mode at least once, so that an equirectangular panoramic image is produced and sent to the AI module 25. The AI module 25 performs at least one of human detection, human face detection and human head detection over the equirectangular panoramic image using a trained model to locate at least one region of interest (ROI) in the equirectangular panoramic image, and then generates information of the at least one ROI (hereinafter called "ROI information"). The ROI information includes, with limitation, equirectangular coordinates of vertices of the at least one ROI. The human detection, human face detection and human head detection using the trained model include, but are not limited to, (a) a deep learning-based approach and/or (b) a machine leaning-based approach. The deep learning-based approach is one kind of AI detection, for example, using a programming language Python together with an open source computer vision library OpenCV, an open source neural network library Keras and an open source database TensorFlow. Here, OpenCV is used to capture image information for image processing, and a neural network model provided by Keras is used to perform model training with TensorFlow functioning as the backend. On the other hand, the machine leaning-based approach can be categorized into different learning models, such as hidden Markov models (HMM) and support vector machines (SVM). Basically, conventional machine leaning-based approach requires a developer to decide what features of an image to be used (e.g., turning a portrait into a gradient array), and then the features are transmitted to a learning model (e.g., SVM or HMM) for training and testing. Regarding the deep learning-based approach, the model itself can decide feature points (that is, the feature point extraction has been incorporated into the model), so the image can be directly transmitted to the deep learning model (e.g., multilayer perceptron (MLP), deep neural network (DNN), convolutional neural network (CNN), recurrent neural network (RNN) and the like). Afterwards, training and testing are carried out. The deep learning and machine leaning technologies are well known in the art, so detailed descriptions thereof will be omitted here. It should be understood, however, that the disclosure is not limited thereto, and any existing or yet-to-be developed human, human face and human head detection are also applicable to the AI module 25.

The AI module 25 may be hardware, software, or a combination of hardware and software (or firmware). In an embodiment, the AI module 25 is implemented by an AI chip. In one embodiment, the AI chip is implemented by a graphics processing unit (GPU), an application-specific integrated circuits (ASICs), or a combination thereof that are specialized for AI calculation. The GPU is often used for initially developing and refining AI algorithms (e.g., the deep learning-based approach and/or the machine leaning-based approach as set forth above); this process is known as "training." The ASIC can be designed for either training or inference. In an alternative embodiment, AI algorithms (e.g., the deep learning-based approach and/or the machine leaning-based approach as set forth above) run on other types of chips, including a general-purpose chip like a central processing unit (CPU) or a general-purpose processor. In other words, the AI module 25 can be implemented with a general-purpose processor and a program memory. The program memory stores a processor-executable program related to the deep learning-based approach and/or the machine leaning-based approach as set forth above. When the processor-executable program is executed by the general-purpose processor, the general-purpose processor is configured to function as: the AI module 25.

FIG. 5A is an example showing two detected ROIs 510 and 520 respectively overlap the overlap regions A(2) and A(4) in the equirectangular panoramic image 500. In the example of FIG. 5A, it is assumed that: (1) the equirectangular panoramic image 500 is produced by the image processing apparatus 220 and sent to the AI module 25; (2) the AI module 25 performs either human detection or human face detection or human head detection over the equirectangular panoramic image 500 to locate two ROIs 510 and 520, and then supplies the ROI information (including equirectangular coordinates of vertices of the ROIs 510 and 520) to the vertex list generator 240. According to the original main vertex list, the vertex list generator 240 performs intersection between the equirectangular coordinates of four vertices of the ROI 510 and the measuring column in the overlap region A(2) to obtain a transverse segment 511 with equirectangular coordinates of four vertices c0~c3, and performs intersection between the equirectangular coordinates of four vertices of the ROI 520 and the measuring column in the overlap region A(4) to obtain three transverse segments 521~523 with equirectangular coordinates of eight vertices c4~c7 and a6~a9. On the other hand, if the ROI information indicates the ROI(s) does not overlap the measuring columns in the overlap regions A(1)~A(4), then no transverse segment and no original ROI vertex list would be produced by the vertex list generator 240.

According to the original main vertex list, equirectangular coordinates of the four vertices c0~c3 and their most adjacent vertices a0~a5 at the measuring column in the overlap region A(2), the vertex list generator 240 performs interpolation over the texture coordinates of the adjacent vertices a0~a5 for each lens image to obtain corresponding texture coordinates of each lens image for each vertex c0~c3. According to the texture coordinates of the vertices c0~c3, the control points R(6)~R(10) and the image center of each lens image, the vertex list generator 240 determines the "warping coefficient indices in $i^{th}$ lens image ($idx_{i0}$, $idx_{i1}$)" field and calculates the "blending weight for warping coefficients in $i^{th}$ lens image (Alpha)" field for each lens image in the data structure of each of vertices c0~c3 in the original ROI vertex list.

Figure 5B:
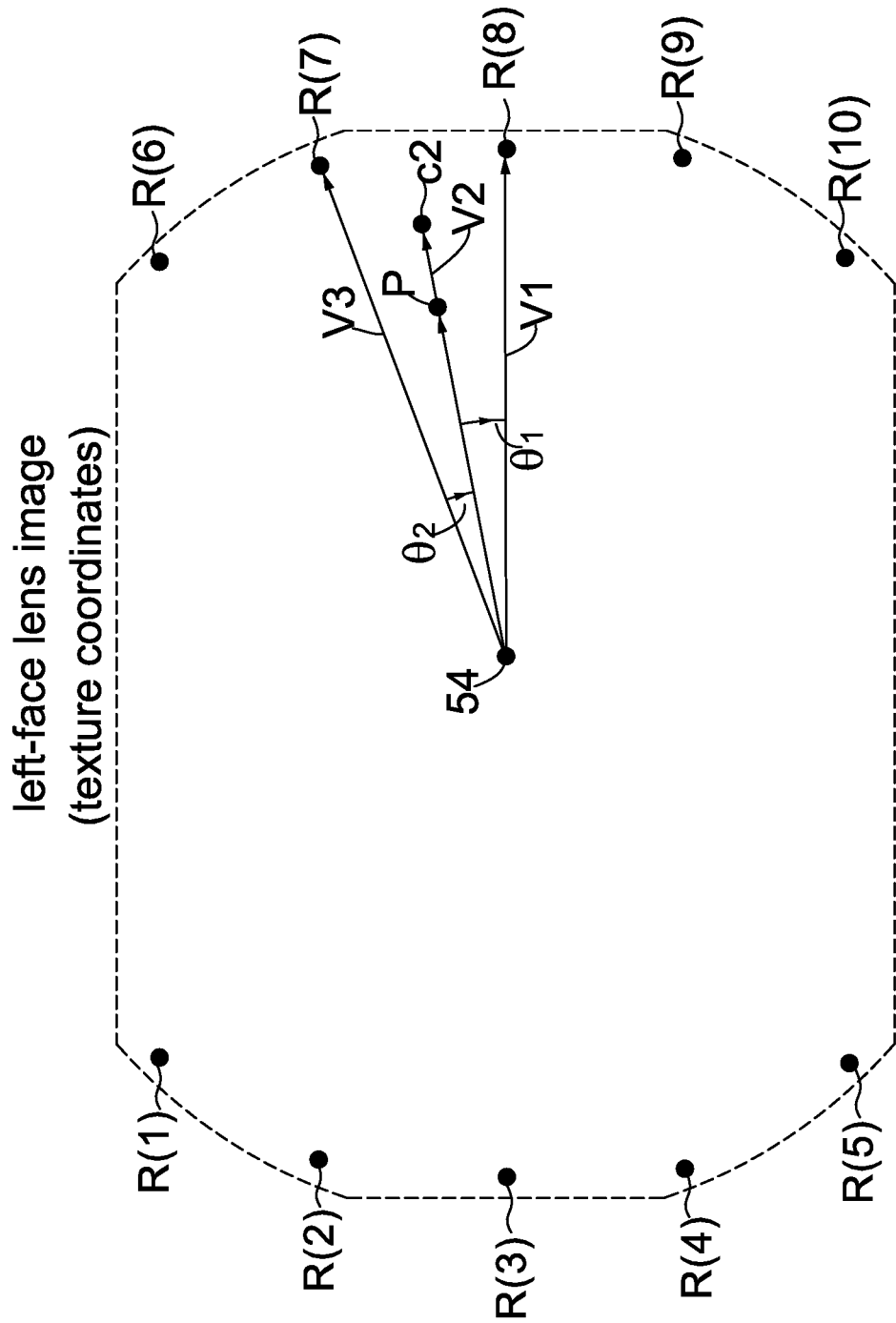
FIG. 5B is an example showing position relationship between two vertices c2 and P and ten control points R(1)~R(10) in the left-face lens image.

FIG. 5B is an example showing a position relation between a vertex c2 (based on FIG. 5A) and ten control points R(1)~R(10) in the left-face lens image. In the example of FIG. 5B, the first angle $\theta_1$ is clockwise and formed between a first vector V1 (starting from the image center 54 (with texture coordinates ($u_{center}$, $v_{center}$)) to the control point R(8)) and a second vector V2 (starting from the image center 54 to the target vertex c2 with texture coordinates ($u_{c2}$, $v_{c2}$)), and the angle $\theta_2$ is clockwise and formed between a third vector V3 (starting from the image center 54 to the control point R(7) and the second vector V2. The vertex list generator 240 determines which two control points (i.e., R(7) and R(8)) are immediately adjacent to the target vertex c2 and writes their indices (7 and 8) to the "warping coefficient indices" field in the left-face lens image of the data structure of the vertex c2 in an original ROI vertex list; besides, the vertex list generator 240 calculates a blending weight ($=\theta_1/\theta_1+\theta_2$) for the optimal/test warping coefficients (C(7) and C(8), or $C_t(7)$ and $C_t(8)$) and writes the corresponding blending weight ($=\theta_1/\theta_1+\theta_2$) to the "Alpha" field in the left-face lens image of the data structure of the vertex c2 in the original ROI vertex list." Assuming that the stitching decision 230 generates twenty optimal warping coefficients C(1)~(20) in sequence at the end of measuring mode, the values in the "warping coefficient indices" field and the "Alpha" field are used in rendering mode by the vertex list generator 240 to calculate the interpolated warping coefficient C' in the left-face lens image for the vertex c2 by the following equation: C'=C(7)×($\theta_1$/($\theta_1+\theta_2$))+C(8)×($\theta_2$/($\theta_1+\theta_2$)) (will be described below). In this manner, the vertex list generator 240 completes values in all the fields for the left-face lens image in the data structure of the vertex c2. In the same manner, the vertex list generator 240 completes values in all the fields for all the lens images in the data structures of the vertices c0~c7 and a6~a9. The original ROI vertex list includes the following vertices with their data structures in sequence: {c0, c1, c2, c3, c4, c5, a6, a7, a8, a9, c6, c7}.

Figure 5C:
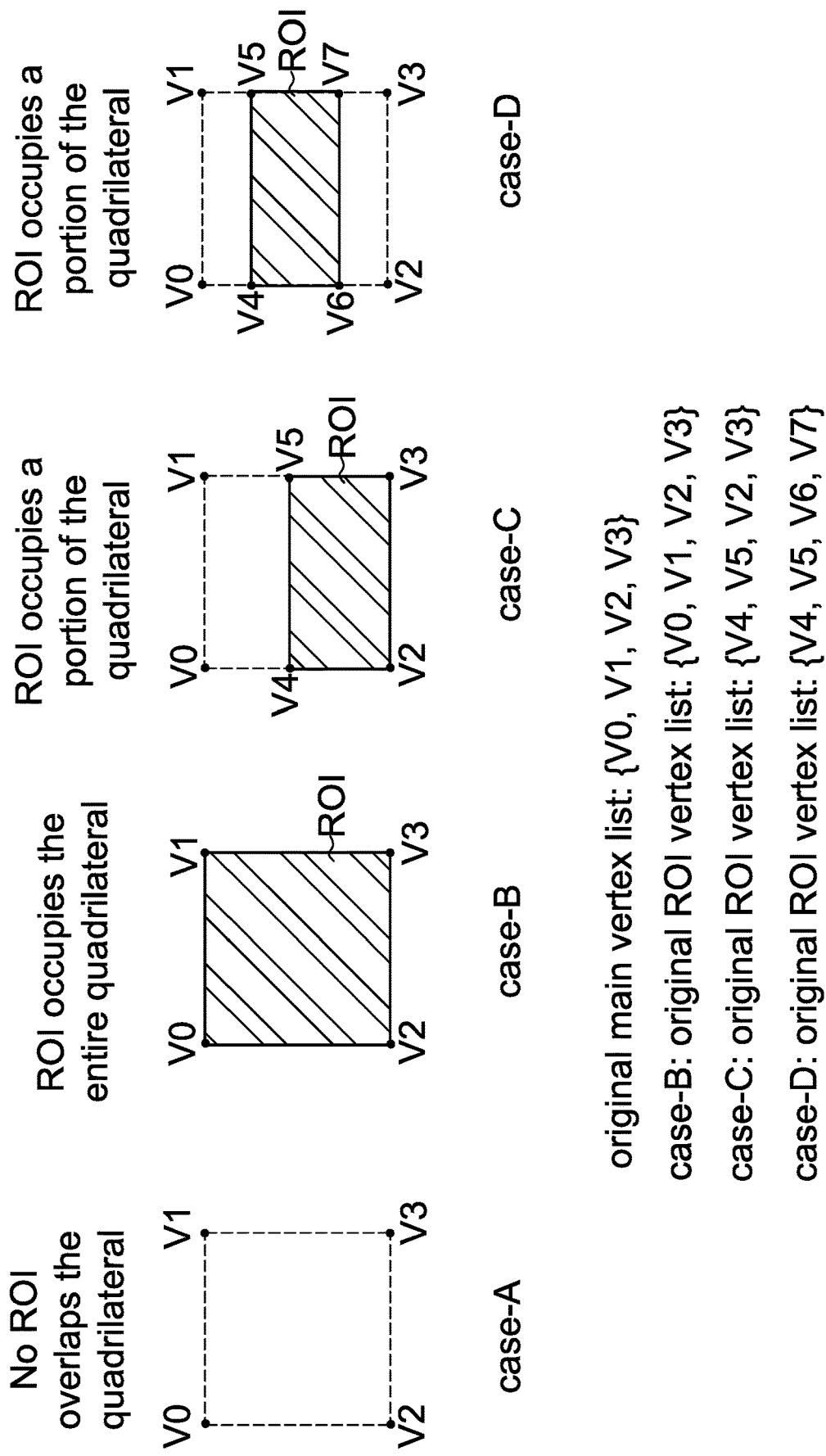
FIG. 5C shows four cases showing different position relationship between a detected ROI and a quadrilateral (having four vertices V0~V3) of the measuring column in one of the overlap regions.

FIG. 5C shows four cases that a detected ROI overlaps a quadrilateral (having four vertices V0~V3) of the measuring column in one of the overlap regions. In case-A, no ROI overlaps the quadrilateral and thus no original ROI vertex list needs to be generated. If one of case-B, case-C and case-D occurs, the projection image processing system 200 enters the measure mode. In case-B, a ROI occupies the entire quadrilateral and thus the vertex list generator 240 directly copies the data structures (excluding the "Blending weight for stitching in $i^{th}$ lens image ($w_i$)" field) of the four vertices V0~V3 from the original main vertex list to the original ROI vertex list. In case-C, a ROI occupies a portion of the quadrilateral; the vertex list generator 240 directly copies the data structures (excluding the "Blending weight for stitching in $i^{th}$ lens image ($w_i$)" field) of the two vertices V2~V3 from the original main vertex list to the original ROI vertex list, and then calculates the texture coordinates, warping coefficient indices ($idx_{i0}$, $idx_{i1}$) and the blending weight for warping coefficients (Alpha) for each lens image (i) in the data structures of the vertices V4~V5, so as to form an original ROI vertex list including four vertices: {V4, V5, V2, V3}. In case-D, a ROI occupies a portion of the quadrilateral; the vertex list generator 240 calculates the texture coordinates, warping coefficient indices ($idx_{i0}$, $idx_{i1}$) and the blending weight for warping coefficients (Alpha) for each lens image (i) in the data structures of the vertices V4~V7, so as to form an original ROI vertex list including four vertices: {V4, V5, V6, V7}.

A feature of the invention is to determine optimal warping coefficients for the twenty control points R(1)~R(20) within a predefined number of loops (e.g., max in FIG. 6A) in measure mode. The predefined number of loops are associated with an offset ofs that a lens center 46 is separated from the camera system center 43 (see FIG. 4C). In measure mode, twenty test warping coefficients $C_t(1)~C_t(20)$ are set by the stitching decision unit 230 to different value ranges for measuring the region errors E(1)~E(20), E(511) and E(521)~E(523) of the measuring regions M(1)~M(20) and the four transverse segments 511 and 521~523 according to the offset ofs in FIG. 4C, but the twenty test warping coefficients are set to the same value at a time (or for each round). For example, in a case of ofs=3 cm, the twenty test warping coefficients $C_t(1)$~$C_t(20)$ are set to values ranging from 0.96 to 1.04 and there would be nine (i.e., max=9 in FIG. 6A) times of measurement if each increment is 0.01; in a case of ofs=1 cm, the twenty test warping coefficients $C_t(1)$~$C_t(20)$ are set from 0.99 to 1.00 and there would be ten (i.e., max=10 in FIG. 6A) times of measurement if each increment is 0.001. Please note that in the offline phase, the offset ofs is already detected/determined and thus the values of the twenty test warping coefficients $C_t(1)$~$C_t(20)$ for measurement are pre-determined.

Figure 6A:
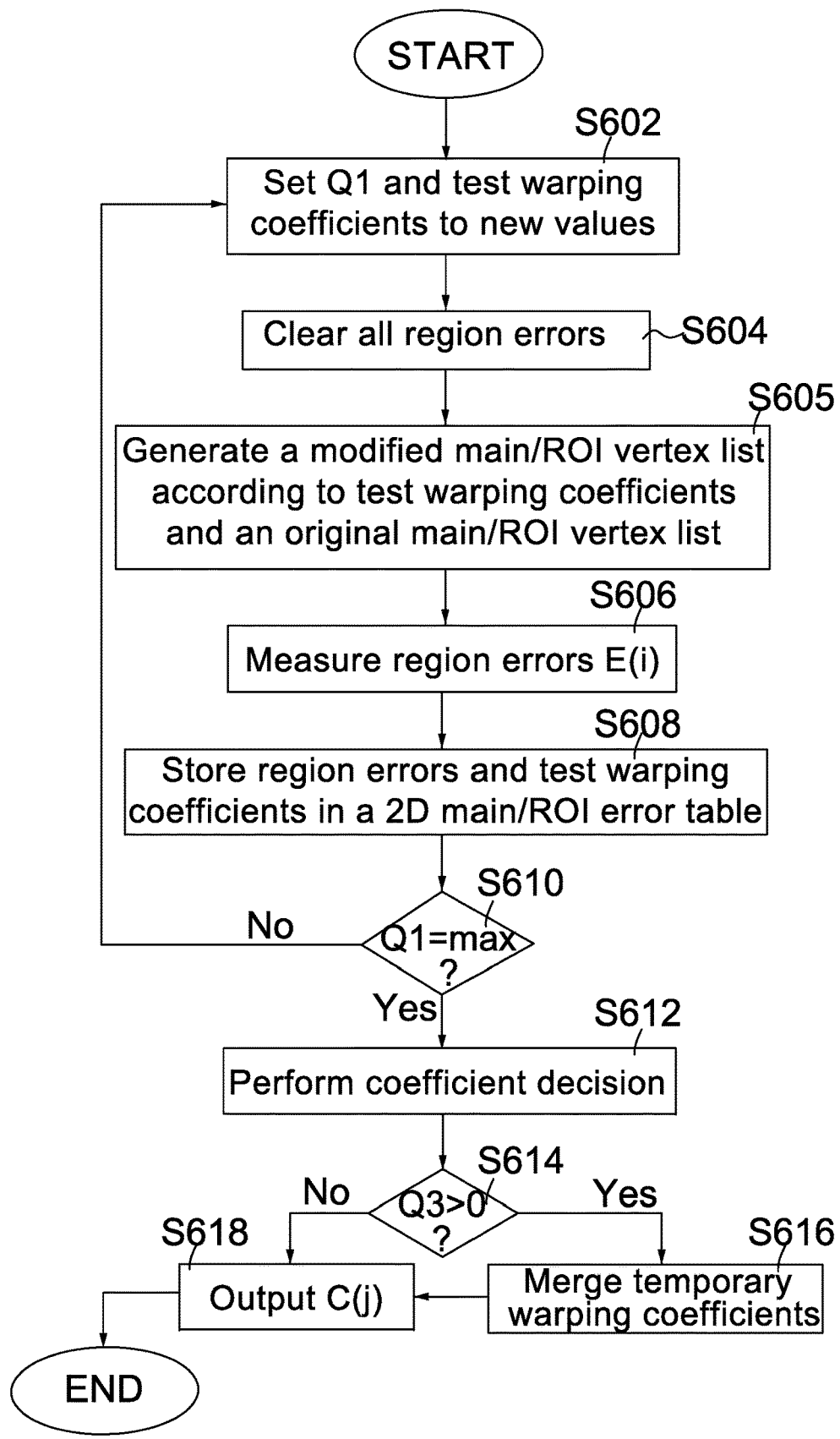
FIG. 6A is a flow chart showing a method of determining the optimal warping coefficients for control points in measure mode performed by the stitching decision unit 230.

FIG. 6A is a flow chart showing a method of determining the optimal warping coefficients for control points in measure mode performed by the stitching decision unit 230. For purpose of clarity and ease of description, the method of determining the optimal warping coefficients $C(1)$~$C(20)$ for twenty control points $R(1)$~$R(20)$ in FIG. 6A, the method of performing the coefficient decision (step S612) in FIGS. 6B-6C and the method of merging temporary warping coefficients (step S616) in FIG. 6E are described with assumption that ofs=3 cm and with reference to the examples in FIGS. 4B and 5A. Here, Q3 denotes the number of the transverse segments; if no transverse segment is produced, Q3 is set to 0. TH1 denotes (Q3+1) plus the total number of control points in the equirectangular panoramic image. TH2 denotes P1 plus 1. As to the examples in FIGS. 4B and 5A, Q3 is set to 4, TH1 is set to 24 and TH2 is set to 6 for initialization. Please note that ofs=3 cm and FIGS. 4B and 5A are provided by way of example, but not limitations of the invention.

Step S602: Respectively set the Q1 number of iterations and test warping coefficients to new values. In one embodiment, set the Q1 number of iterations to 1 in a first round and increment Q1 by 1 in each of the following rounds; since ofs=3 cm, max is set to 9 and set all the twenty test warping coefficients $C_t(1)$~$C_t(20)$ to 0.96 in a first round (i.e., $C_t(1)$= . . . =$C_t(20)$=0.96), and then set them to 0.97, . . . , 1.04 in order in the following eight rounds.

Step S604: Clear all region errors E(i), where i=1, . . . , 20, 511 and 521~523.

Step S605: Generate a modified main vertex list and a modified ROI vertex list according to the original main and the original ROI vertex lists and values of the test warping coefficients $C_t(1)$~$C_t(20)$. Take a vertex P from the original main vertex list in FIG. 5B for example. After receiving the original main vertex list from the vertex list generator 240, the vertex processing device 210 simply retrieves two warping coefficients (e.g., $C_t(7)$ and $C_t(8)$) from a 1-D test warping coefficient array (from the stitching decision unit 230) including twenty elements $C_t(1)$~$C_t(20)$ in sequence based on the "warping coefficient indices" field (e.g., 7 and 8) in the left-face lens image of the data structure of the target vertex P and calculates the interpolated warping coefficient C' based on the "Alpha" field (i.e., $\theta_1/(\theta_1+\theta_2)$) in the left-face lens image of the data structure of the target vertex P (see Table 1) by the following equation: $C'=C_t(7)\times(\theta_1/(\theta_1+\theta_2))+C_t(8)\times(\theta_2/(\theta_1+\theta_2))$. Then, the vertex processing device 210 calculates modified texture coordinates $(u'_p, v'_p)$ in the left-face lens image for the target vertex P with texture coordinates $(u_p, v_p)$ according to the following equations: $u'_p=(u_p-u_{center})\times C'+u_{center}$; $v'_p=(v_p-v_{center})\times C'+v_{center}$. In this manner, the vertex processing device 210 modifies all the texture coordinates in the left-face lens image for each vertex from the original main vertex list according to the twenty test warping coefficients $C_t(1)$~$C_t(20)$ to generate a portion of a modified main vertex list. Likewise, the vertex processing device 210 respectively modifies all the texture coordinates in front-face, right-face and back-face lens images for each vertex from the original main vertex list according to the twenty test warping coefficients $C_t(1)$~$C_t(20)$ to complete the modified main vertex list (see Table 2). Likewise, the vertex processing device 210 respectively modifies all the texture coordinates for each lens image in the data structure of each vertex from the original ROI vertex list according to the twenty test warping coefficients $C_t(1)$~$C_t(20)$ to generate a modified ROI vertex list. As set forth above, the data structure of each vertex in the modified ROI vertex list is similar to that of the modified main vertex list (Table 2), but excludes the "Blending weight for stitching in $i^{th}$ lens image ($w_i$)" field.

Step S606: Measure/obtain region errors E(i) for twenty measuring regions M(1)~M(20) and four segments 511 and 521~523 in the equirectangular panoramic image by the image processing apparatus 220 based on the modified main and the modified ROI vertex lists and four lens images from the image capture module 21, where i=1~20, 511 and 521~523, (will be described in connection with FIG. 7).

Step S608: Store all region errors and all values of test warping coefficients in a 2D main error table and a 2D ROI error table. Table 3A shows an exemplary two-dimensional (2D) main error table for ofs=3 cm (test warping coefficients ranging from 0.96 to 1.04). In Table 3A, there are nine values for test warping coefficients (0.96~1.04) and each value corresponds to a set of twenty region errors E(1)~E(20).

TABLE 3A

| | 1st | 2nd | 3rd | — | 7th | 8th | 9th |
|---|---|---|---|---|---|---|---|
| | | | Test warping coefficient | | | | |
| | 0.96 | 0.97 | 0.98 | — | 1.02 | 1.03 | 1.04 |
| E(1) | | | | | | | |
| E(2) | | | | | | | |
| | | | | — | | | |
| E(17) | | | | | | | |
| E(18) | | | | | | | |
| E(19) | | | | | | | |
| E(20) | | | | | | | |

Table 3B shows an exemplary 2D ROI error table for ofs=3 cm (test warping coefficients ranging from 0.96 to 1.04). In Table 3B, there are nine values for test warping coefficients (0.96~1.04) and each value correspond to a set of four region errors E(511) and E(521)~E(523).

TABLE 3B

| | 1st | 2nd | 3rd | — | 7th | 8th | 9th |
|---|---|---|---|---|---|---|---|
| | | | Test warping coefficient | | | | |
| | 0.96 | 0.97 | 0.98 | — | 1.02 | 1.03 | 1.04 |
| E(511) | | | | | | | |
| E(521) | | | | | | | |
| E(522) | | | | | | | |
| E(523) | | | | | | | |

Step S610: Determine whether the Q1 number of iterations reaches a max value of 9. If YES, the flow goes to step S612; otherwise, the flow goes to Step S602.

Step S612: Perform coefficient decision according to the 2D main and the 2D ROI error tables to obtain twenty-four temporary warping coefficients ($C_P(1)$~$C_P(20)$, $C_P(511)$, $C_P(521)$~$C_P(523)$) of twenty control points R(1)~R(20) and four segments 511 and 521~523.

Step S614: Determine whether Q3 is greater than 0. If YES, it indicates at least one transverse segment is produced and the flow goes to step S616; otherwise, it indicates no transverse segment is produced and the flow goes to Step S618.

Step S616: Merge the temporary warping coefficients ($C_P(511)$, $C_P(521)$~$C_P(523)$) of the four segments 511 and 521~523 into the temporary warping coefficients ($C_P(1)$~$C_P(20)$) of the twenty control points R(1)~R(20).

Step S618: Output the twenty temporary warping coefficients $C_P(j)$ as the optimal warping coefficients C(j), where j=1, . . . , 20. In rendering mode, the twenty optimal warping coefficients C(1)~C(20) are outputted to the vertex processing device 210 for generation of a corresponding modified main modified vertex list, and then the image processing apparatus 220 generates a corresponding equirectangular panoramic image based on the modified main vertex list and the four lens images from the image capture module 21.

Figure 6B:
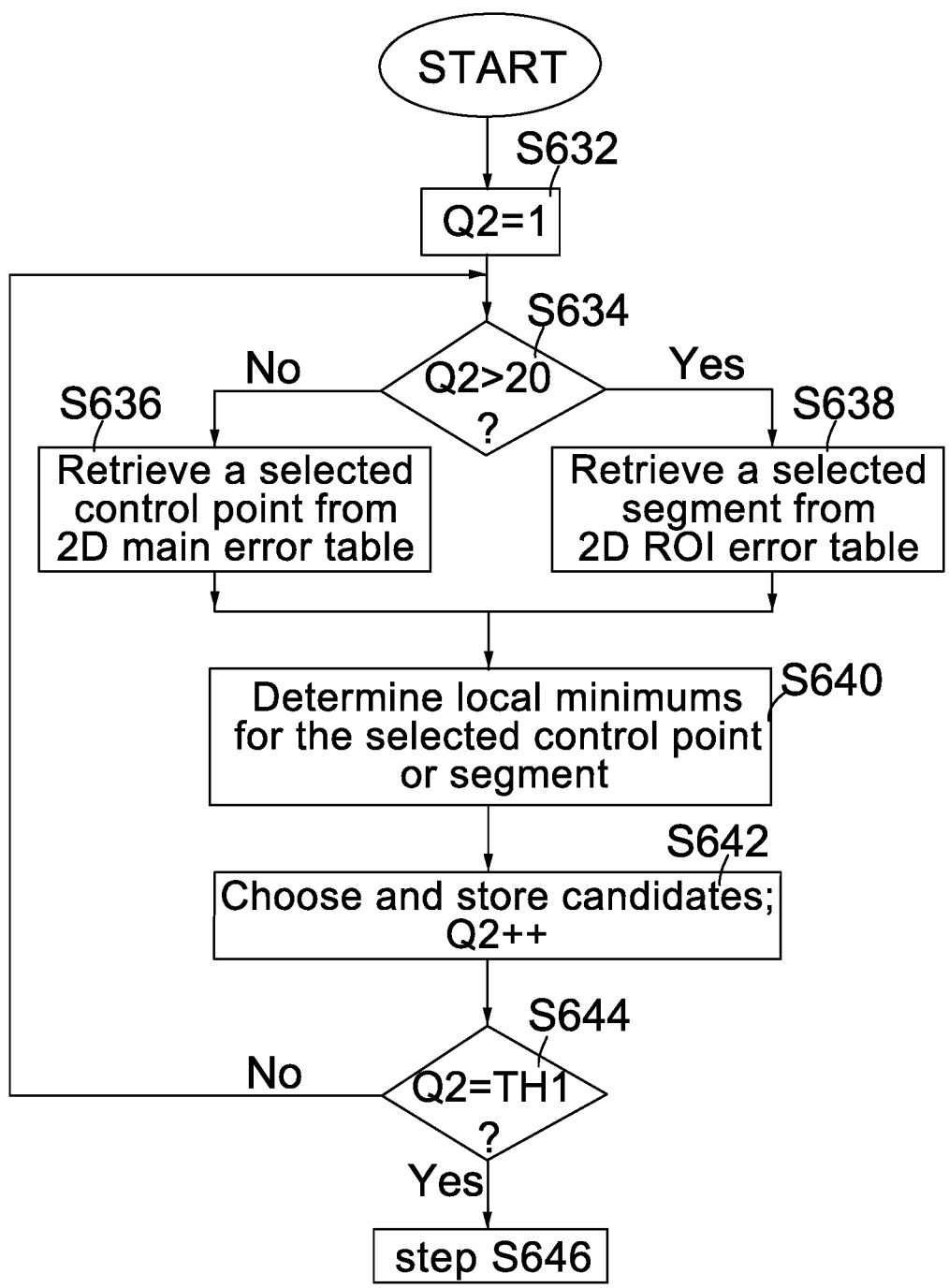
FIGS. 6B and 6C show a flow chart showing the method of performing the coefficient decision in step S612 by the stitching decision unit 230 according to an embodiment of the invention.
Figure 6C:
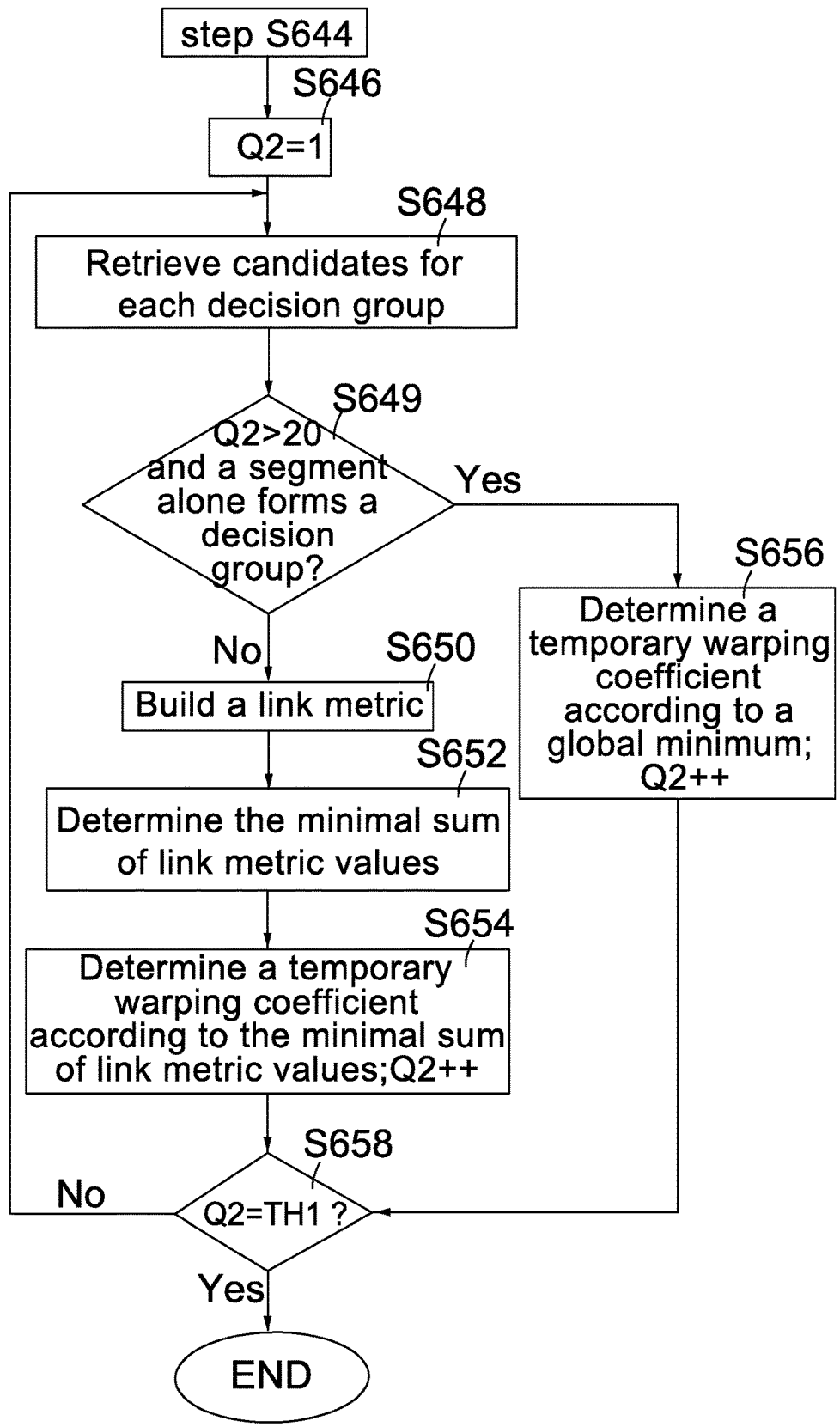

FIGS. 6B-6C show a flow chart showing the method of performing the coefficient decision in step S612 by the stitching decision unit 230 according to an embodiment of the invention.

Step S632: Set Q2 to 1 for initialization.

Step S634: Determine whether Q2 is greater than 20. If YES, the flow goes to Step S638 for processing a transverse segment; otherwise, the flow goes to Step S636 for processing a control point.

Step S636: Retrieve information about a selected control point from the 2D main error table (e.g., Table 3A). For example, retrieve information about a selected control point R(10) if Q2=10. The information includes all the test warping coefficients and nine region errors for the selected control point.

Step S638: Retrieve information about a selected transverse segment from the 2D ROI error table (e.g., Table 3B). For example, retrieve information about a selected transverse segment (511) if Q2=21, retrieve information about a selected transverse segment R(521) if Q2=22, . . . , and retrieve information about a selected transverse segment R(523) if Q2=24. The information includes all the test warping coefficients and corresponding nine region errors for the selected transverse segment.

Step S640: Determine local minimums among the region errors for the selected control point or transverse segment (511 and 521~523). Table 4A is an example showing the region errors E(6)~E(8) and the nine values of the test warping coefficients based on Table 3A.

TABLE 4A

| index | test warping coefficient | E(6) | E(7) | E(8) |
|---|---|---|---|---|
| 1 | 0.96 | 1010 | 2600(*) | 820 |
| 2 | 0.97 | 1005 | 2650 | 750 |
| 3 | 0.98 | 1000 | 2800 | 700 |
| 4 | 0.99 | 900 | 3000 | 600(*) |
| 5 | 1.00 | 800(*) | 2700 | 650 |
| 6 | 1.01 | 850 | 2500 | 580 |
| 7 | 1.02 | 950 | 2400(*) | 500(*) |
| 8 | 1.03 | 960 | 2820 | 700 |
| 9 | 1.04 | 975 | 2900 | 800 |

As shown in Table 4A, there is one local minimum among the nine region errors E(6), and there are two local minimums among the nine region errors E(7) and E(8), where each local minimum is marked with an asterisk.

Table 4B is an example showing the region errors E(511) and the nine values of the test warping coefficients based on Table 3B. There are two local minimums among the nine region errors E(511).

TABLE 4B

| index | test warping coefficient | E(511) |
|---|---|---|
| 1 | 0.96 | 3200(*) |
| 2 | 0.97 | 3280 |
| 3 | 0.98 | 3300 |
| 4 | 0.99 | 3400 |
| 5 | 1.00 | 3000(*) |
| 6 | 1.01 | 3100 |
| 7 | 1.02 | 3200 |
| 8 | 1.03 | 3200 |
| 9 | 1.04 | 3300 |

Step S642: Choose and store candidates according to the local minimums for the selected control point or segment. Table 5 shows candidates based on the local minimums as shown in Table 4A. The number of candidates is equal to the number of the local minimums in Table 4A. Take the selected control point R(7) (i.e., Q2=7) for example. The selected control point R(7) has two candidates [0] and [1], each including a corresponding index (ID), a corresponding test warping coefficient (WC) and a corresponding region error (RE). The two candidates of the selected control point R(7) are stored in a memory device or a buffer (not shown).

TABLE 5

| | R(6) | | | R(7) | | | R(8) | | |
|---|---|---|---|---|---|---|---|---|---|
| | Number of local minimums | | | | | | | | |
| | 1 | | | 2 | | | 2 | | |
| | ID | WC | RE | ID | WC | RE | ID | WC | RE |
| Candidate [0] | 5 | 1.00 | 800 | 1 | 0.96 | 2600 | 4 | 0.99 | 600 |
| Candidate [1] | | | | 7 | 1.02 | 2400 | 7 | 1.02 | 500 |

Please note that in steps S640~S642, the operations for each selected transverse segment (511 and 521~523) are the same as the operations for each selected control point and thus their descriptions are omitted herein. Here, the Q2 number of iterations is incremented by 1.

Step S644: Determine whether the Q2 number of iterations reaches a limit value of TH1(=25). If YES, the flow goes to step S646; otherwise, the flow goes to Step S634 for a next control point or segment.

Step S646: Set Q2 to 1.

Step S648: Determine a selected decision group according to a selected control point/segment to retrieve candidates of all the control points/segments in the selected decision group.

Referring to FIG. 4B, since each control point normally adjoins two control points, a selected control point along with its two neighboring control points form a selected decision group to determine the temporary warping coefficient for the selected control point. For example, a selected control point R(9) along with R(8) and R(10) form a selected decision group. However, if a selected control point (such as R(6)) is located at top or bottom of the overlap region A(2), then the selected control point R(6) form a selected decision group along with its single neighbor R(7) to determine its temporary warping coefficient $C_P(6)$. Thus, there are twenty decision groups related to the control points according to Table 3A and FIG. 4B. In the example of the 2D ROI error table in Table 3B and FIG. 5A, there are only four decision groups related to the transverse segments as follows: the first one is segment 511 alone, the second one is segment 521 along with its neighboring single segment 522, the third one is segment 522 along with its neighboring segments 521 and 523, and the fourth one is segment 523 along with its neighboring single segment 522.

In this scenario, the candidates of a selected control point and its one or two neighboring control points in the same decision group are simultaneously retrieved from the memory device or the buffer as mentioned in step S642; alternatively, the candidates of a selected transverse segment and its zero or one or two neighboring segments in the same decision group are simultaneously retrieved from the memory device or the buffer as mentioned in step S642. For example, candidates of a selected control point R(11) along with control point R(12) are simultaneously retrieved if Q2=11; candidates of a selected segment 511 are retrieved if Q2=21; candidates of a selected segment 521 along with the segment 522 are simultaneously retrieved if Q2=22; candidates of a selected segment 522 along with segments 521 and 522 are simultaneously retrieved if Q2=23; candidates of a selected segment 523 along with the segment 522 are simultaneously retrieved if Q2=24. For ease of description, the following steps are described with the assumption that R(7) is selected and forms a selected decision group along with R(6) and R(8) to determine its temporary warping coefficient $C_P(7)$.

Step S649: Determine whether Q2>20 and a corresponding transverse segment alone forms a decision group. If YES, the flow goes to step S656; otherwise, the flow goes to Step S650.

Figure 6D:
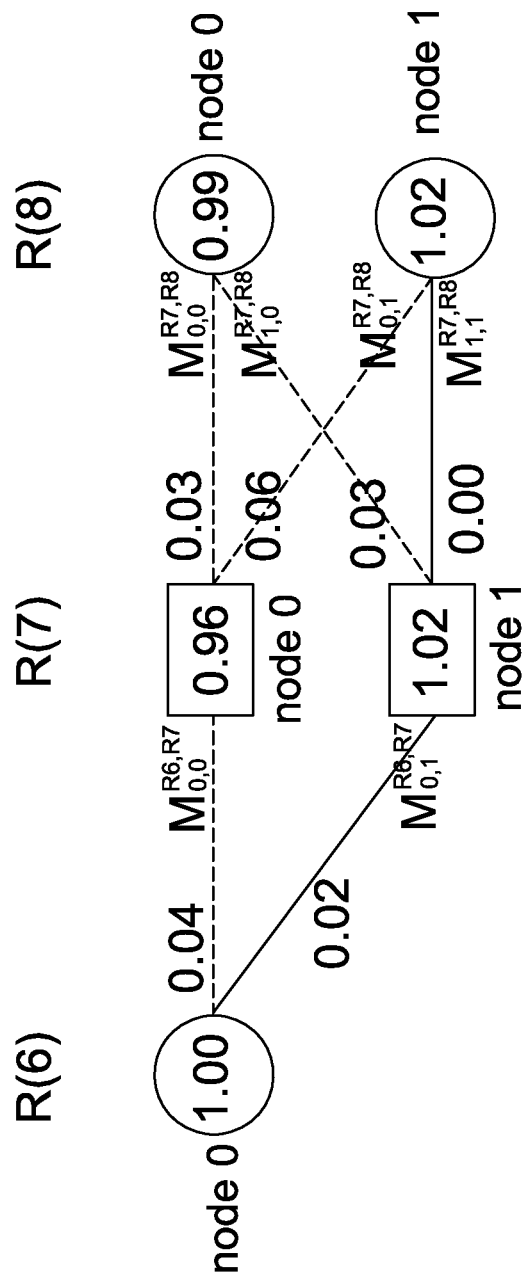
FIG. 6D shows an exemplary link metric.
Figure 6E:
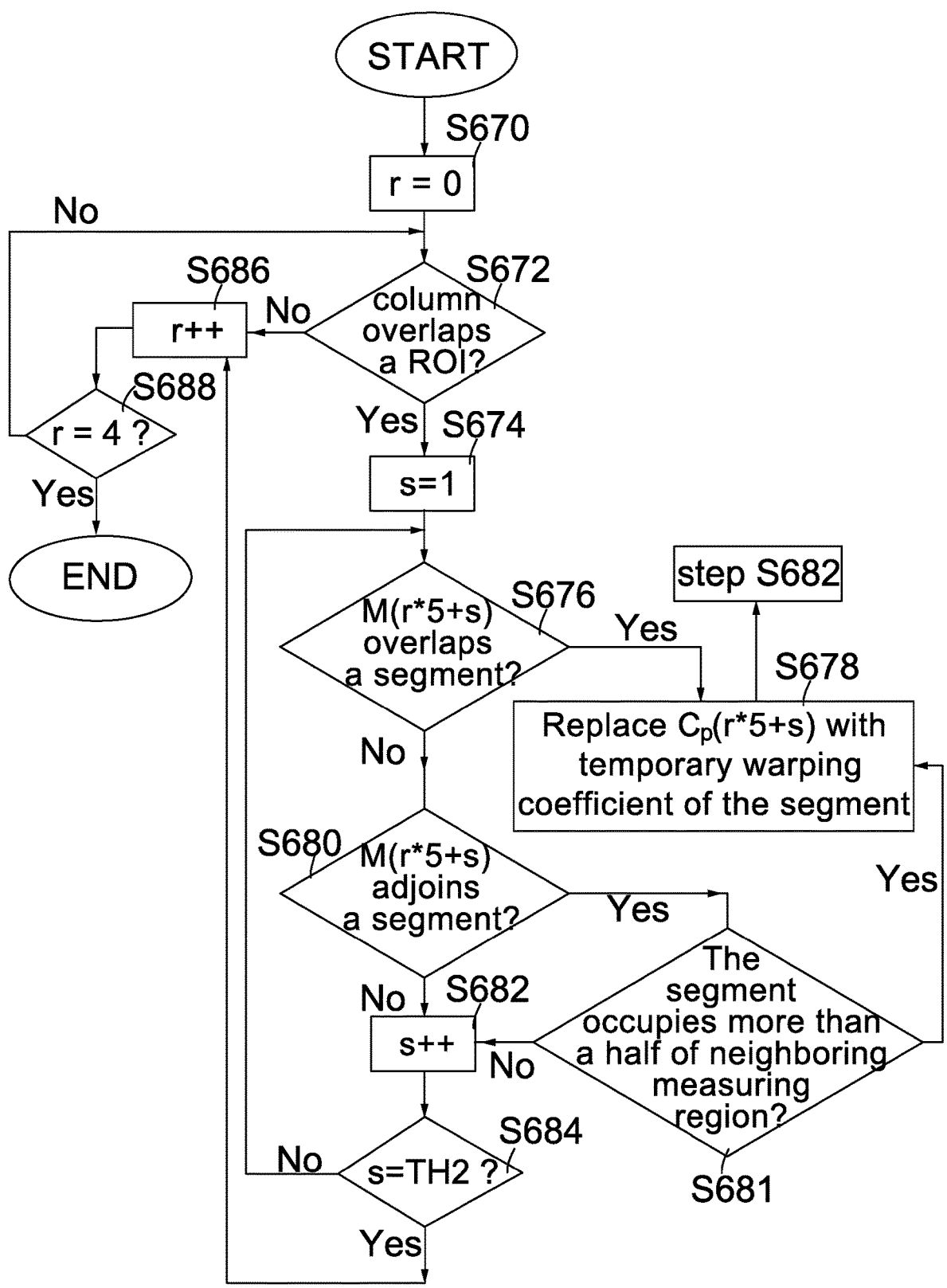
FIG. 6E is a flow chart showing the method of merging the temporary warping coefficients in step S616 by the stitching decision unit 230 according to an embodiment of the invention.

Step S650: Build a link metric according to the candidates of the control points or segments in the same decision group. As shown in FIG. 6D, a link metric is built according to the candidates of control points R(6)~R(8) in Table 5.

Step S652: Determine the minimal sum of link metric values among the paths. For the link metric values $M_{0,0}^{R7,R8}=0.03$ and $M_{0,1}^{R7,R8}=0.06$, their minimum value $d_0^{R7,R8}=\min(M_{0,0}^{R7,R8}, M_{0,1}^{R7,R8})=0.03$. For the link metric values $M_{1,0}^{R7,R8}=0.03$ and $M_{1,1}^{R7,R8}=0.00$, their minimum value $d_1^{R7,R8}=\min(M_{1,0}^{R7,R8}, M_{1,1}^{R7,R8})=0.00$. Then, respectively compute sums of link metric values for path 0-0-0 and path 0-1-1 as follows: $S_0^{R7}=d_0^{R6,R7}+d_0^{R7,R8}=0.04+0.03=0.07$ and $S_1^{R7}=d_1^{R6,R7}+d_1^{R7,R8}=0.02+0.00=0.02$. Since $S_0^{R7}>S_1^{R7}$, it is determined that $S_1^{R7}$ (for path 0-1-1) is the minimal sum of link metric values among the paths as the solid-line path shown in FIG. 6D.

Step S654: Determine a temporary warping coefficient for the selected control point or the selected segment according to the minimal sum of link metric values. As to the example given in step S652, since $S_1^{R7}$ (for path 0-1-1) is the minimal sum of link metric values among the paths, 1.02 is selected as the temporary warping coefficient of control point R(7). However, if two or more paths have the same sum at the end of calculation, the test warping coefficient of the node with minimum region error is selected as the temporary warping coefficient of the selected control point or segment. Please note that the operations in steps S650~S654 for each selected transverse segment (511, 521~523) are the same as the operations in steps S650~S654 for each selected control point and thus their descriptions are omitted herein. Here, the Q2 number of iterations is incremented by 1.

Step S656: Determine a temporary warping coefficient for the selected segment according to a global minimum of region errors of the selected segment. As set forth above, segment 511 alone forms a decision group. In this special case, referring to Table 4B, the test warping coefficient with the value of 1.00 is directly selected as the temporary warping coefficient $C_P(511)$ of segment 511 because it corresponds to a global minimum (i.e., 3000) of region errors E(511). Here, the Q2 number of iterations is incremented by 1.

Step S658: Determine whether the Q2 number of iterations reaches a limit value of TH1(=25). If YES, the flow is terminated; otherwise, the flow goes to Step S648 for a next control point or segment.

FIG. 6E is a flow chart showing the method of merging the temporary warping coefficients in step S616 by the stitching decision unit 230 according to an embodiment of the invention.

Step S670: Set r to 0 for initialization. The parameter r denotes the overlap region index.

Step S672: Determine whether the measuring column in overlap region A(r+1) overlaps a ROI. If YES, the flow goes to Step S674; otherwise, the flow goes to Step S686. As to the example of FIG. 5A, the measuring columns in overlap regions A(2) and A(4) respectively overlap ROIs 510 and 520.

Step S674: Set s to 1 for initialization. The parameter s denotes the measuring region index in one column.

Step S676: Determine whether the measuring region M(r×5+s) overlaps a transverse segment (e.g., 511, 521~523). If YES, the flow goes to Step S678; otherwise, the flow goes to Step S680.

Step S678: Replace the temporary warping coefficient $C_P$(r×5+s) of the measuring region M(r×5+s) with the temporary warping coefficient of a corresponding segment. For example, $C_P(7)$ and $C_P(8)$ of measuring regions M(7) and M(8) are replaced with the temporary warping coefficient $C_P(511)$ of the segment 511 in the example of FIG. 5A.

Step S680: Determine whether the measuring region M(r×5+s) adjoins (or is next to) a segment. If YES, the flow goes to Step S681; otherwise, the flow goes to Step S682. As to the example of FIG. 5A, the transverse segment 511 overlaps the measuring regions M(7) and M(8) and is located next to the measuring regions M(6) and M(9).

Step S681: Determine whether the segment occupies more than a half of neighboring measuring region (M(r×5+s−1) or M(r×5+s+1)), where (s−1)>=1 and (s+1)<=5. If YES, the flow goes to Step S678 for replacing; otherwise, the flow goes to Step S682 without replacing. For example, when r=s=1 (i.e., at M(6)), it is determined that segment 511 occupies "more than" a half of neighboring measuring region M(7) and then $C_P(6)$ of measuring region M(6) needs to be replaced with $C_P(511)$ of segment 511 in step S678 when r=1 and s=4 (i.e., at M(9)), it is determined that segment 511 occupies "less than" a half of neighboring measuring region M(8) and then there is no need for $C_P(9)$ to be replaced with $C_P(511)$.

Step S682: Increment s by 1.

Step S684: Determine whether s reaches a limit value of TH2(=6). If YES, the flow goes to Step S686; otherwise, the flow goes to Step S676 for a next measuring region.

Step S686: Increment r by 1.

Step S688: Determine whether r reaches a limit value of 4. If YES, the flow is terminated; otherwise, the flow goes to Step S672 for a next measuring column (or overlap region).

Please note that in the above examples and embodiments, the transverse segment 511 is process/treated as a single block. In an alternative embodiment, the transverse segment 511 is split into a first sub-segment (c0,c1,a2,a3) and a second sub-segment (a2,a3,c2,c3). The way that the first and the second sub-segments are processed in methods of FIGS. 6A~6E is similar to that of the segments 521~523, so their detailed descriptions are omitted herein.

Figure 7:
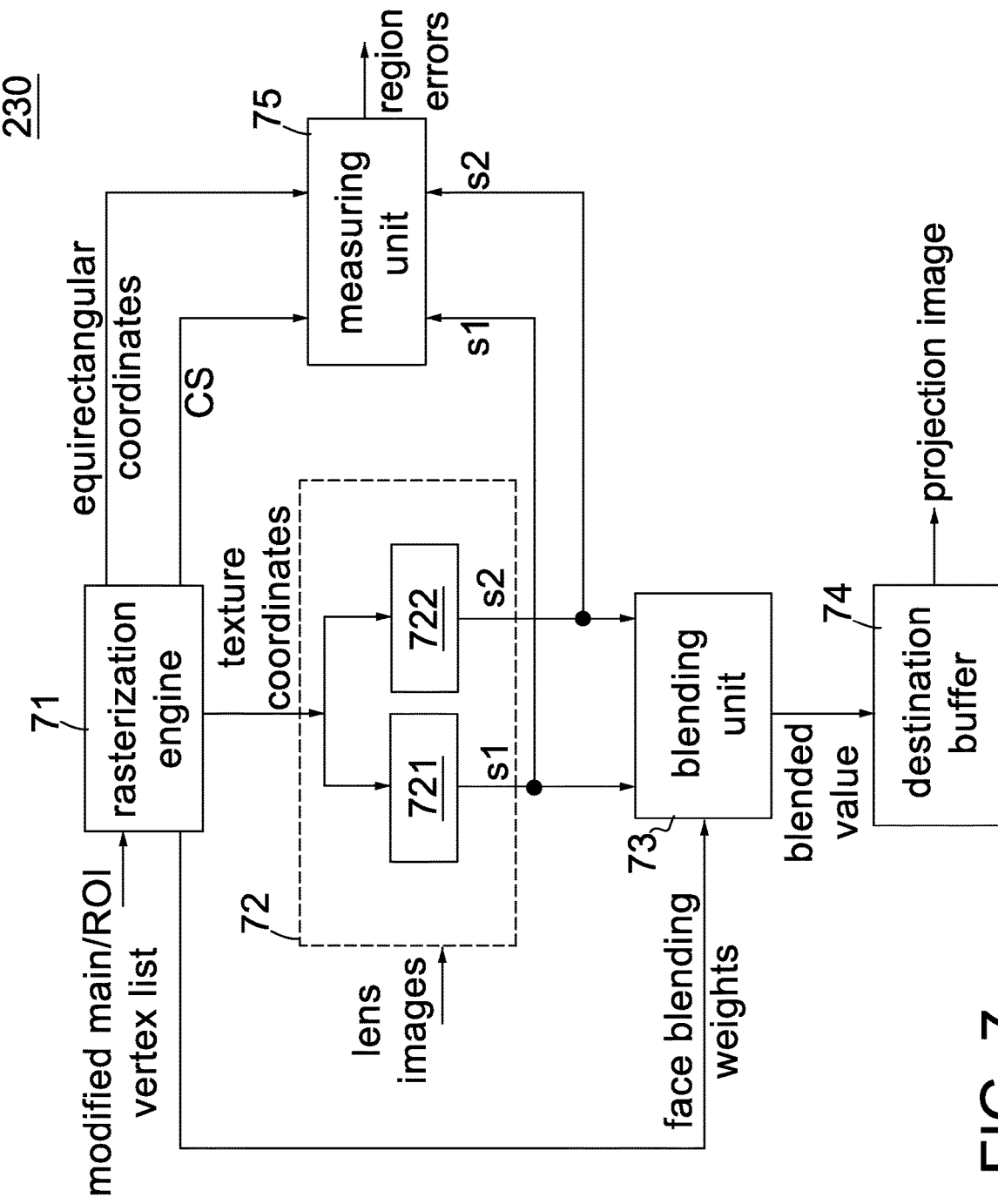
FIG. 7 is a schematic diagram showing the image processing apparatus according to one embodiment of the invention.

As to Step S606, the way that the image processing apparatus 230 measures region errors (E(1)~E(20), E(511) and E(521)~E(523)) is described below. Take measuring the region error E(511) for example. FIG. 7 is a schematic diagram showing the image processing apparatus according to one embodiment of the invention. Referring to FIG. 7, the image processing apparatus 230 includes a rasterization engine 71, a texture mapping circuit 72, a blending unit 73, a destination buffer 74 and a measuring unit 75. The texture mapping circuit 72 includes two texture mapping engines 721~722.

In measure mode, the blending unit 73 is disabled; the rasterization engine 71 receives retrieves four vertices c0~c3 forming a quadrilateral from the modified ROI vertex list, and asserts the control signal CS to enable the measuring unit 75. The four vertices (c0, c1, c2, c3) have the following data structures: vertex c0:$\{(x_{c0}, y_{c0}), 2, ID_{Left}, (u_{1c0}, v_{1c1}), ID_{Front}, (u_{2c1}, v_{2c0})\}$; vertex c1:$\{(x_{c1}, y_{c0}), 2, ID_{Left}, (u_{1c1}, v_{1c1}), ID_{Front}, (u_{2c1}, v_{2c2})\}$; vertex c2:$\{(x_{c2}, y_{c2}), 2, ID_{Left}, (u_{1c2}, v_{1c2}), ID_{Front}, (u_{2c2}, v_{2c2})\}$; vertex c3: $\{(x_{c3}, y_{c3}), 2, ID_{Left}, (u_{1c3}, v_{1c3}), ID_{Front}, (u_{2c3}, v_{2c3})\}$.

The rasterization engine 71 performs quadrilateral rasterization operations for a point Q (having equirectangular coordinates (x, y)) in the quadrilateral c0~c3 to generate two pairs of texture coordinates for left-face and front-face lens images in parallel by using the following steps: 1. Compute four spatial weighting values (a,b,c,d) according to equirectangular coordinates $(x_{c0}, y_{c0}, x_{c1}, y_{c1}, x_{c2}, y_{c2}, x_{c3}, y_{c3}, x, y)$ by using a bi-linear interpolation method, where, a+b+c+d=1. 2. compute texture coordinates for the sample point $Q_L$ (corresponding to point Q) in left-face lens image: (u1,v1) ($a*u_{1c0}+b*u_{1c1}+c*u_{1c2}+d*u_{1c3}$, $a*v_{1c0}+b*v_{1c1}+c*v_{1c2}+d*v_{1c3}$), compute texture coordinates for the sample point $Q_F$ (corresponding to point Q) in front-face lens image: (u2,v2)=($a*u_{2c0}+b*u_{2c1}+c*v_{2c2}+d*u_{2c3}$, $a*v_{2c0}+b*v_{2c1}+c*v_{2c2}+d*v_{2c3}$). According to the two pairs of texture coordinates (u1, v1) and (u2, v2), texture mapping engines 721~722 texture map the texture data from the left-face and front-face lens images using any appropriate method (such as nearest-neighbour interpolation, bilinear interpolation or trilinear interpolation) to generate two sample values (s1~s2) in parallel. According to the equirectangular coordinates (x, y) of point Q, the measuring unit 75 determines whether the point Q falls in segment 511. If YES, the measuring unit 75 measures the region error E(511) of the segment 511 by using known algorithms, such as SAD (sum of absolute differences), SSD (sum of squared differences), MAD (median absolute deviation), etc. For example, the measuring unit 75 may accumulate the absolute value of the sample value difference between each point in the segment 511 of the left-face lens image and its corresponding point in the segment 511 of the front-face lens image to obtain the SAD value as the region error E(511), by using the following equations: E=|s1−s2|, E(511)+=E. In this manner, the measuring unit 75 measures the region errors E(511) and E(521) ~E(523) for the segments 511 and 521~523 as well as the region errors E(1)~E(20).

The compensation device 22 and the correspondence generator 23 according to the invention may be hardware, software, or a combination of hardware and software (or firmware). An example of a pure solution would be a field programmable gate array (FPGA) design or an ASIC design.

In a preferred embodiment, the vertex processing device 210 and an image processing apparatus 230 are implemented with a graphics processing unit (GPU) and a first program memory; the stitching decision unit 230, the vertex list generator 240 and the correspondence generator 23 are implemented with a general-purpose processor and a second program memory. The first program memory stores a first processor-executable program and the second program memory stores a second processor-executable program. When the first processor-executable program is executed by the GPU, the GPU is configured to function as: the vertex processing device 210 and an image processing apparatus 230. When the second processor-executable program is executed by the general-purpose processor, the general-purpose processor is configured to function as: the stitching decision unit 230, the vertex list generator 240 and the correspondence generator 23.

In an alternative embodiment, the compensation device 22 and the correspondence generator 23 are implemented with a general-purpose processor and a third program memory. The third program memory stores a third processor-executable program. When the third processor-executable program is executed by the general-purpose processor, the general-purpose processor is configured to function as: the compensation device 22 and the correspondence generator 23.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image processing system, comprising:
a multiple-lens camera that captures a X-degree horizontal field of view (FOV) and a Y-degree vertical FOV to generate multiple lens images, where X<=360, Y<=180,
a vertex list generator configured to perform first operations comprising: (a) generating a first main vertex list according to a correspondence table; and (b) generating a first region of interest (ROI) vertex list according to the first main vertex list and a position information of a ROI when the ROI overlaps at least one measuring region inside an overlap region in a projection image; and
an image processing apparatus configured to generate the projection image according to the multiple lens images and a second main vertex list related to the first main vertex list in a rendering mode;
wherein the first main vertex list comprises first vertices forming a polygon mesh modeling the projection image, and wherein the first ROI vertex list comprises second vertices forming a transverse segment associated with an intersection between the ROI and the at least one measuring region.

2. The system according to claim 1, further comprising:
an artificial intelligent (AI) module configured to perform at least one of human detection, human face detection and human head detection using a trained model over the projection image to generate the position information of the ROI.

3. The system according to claim 2, wherein the AI module is implemented by an AI chip and the AI chip is implemented by a graphics processing unit, an application-specific integrated circuit, or a combination thereof.

4. The system according to claim 1, further comprising:
a correspondence generator configured to conduct calibration for the first vertices to generate the correspondence table comprising the first vertices, wherein each first vertex provides a mapping between the multiple lens images and the projection image.

5. The system according to claim 1, wherein the first operation (b) comprises:
performing interpolation over first texture coordinates of multiple first vertices adjacent to the second vertices for each lens image based on first and second destination coordinates of the first and the second vertices to generate second texture coordinates in each lens image for each second vertex;
wherein each first vertex has a first data structure and each second vertex has a second data structure, wherein each first data structure comprises the first destination coordinates in the projection image and the first texture coordinates in each lens image for a corresponding first vertex, and wherein each second data structure comprises the second destination coordinates in the projection image and the second texture coordinates in each lens image for a corresponding second vertex.

6. The system according to claim 5, wherein the first operation (b) further comprises:
calculating two indices of two adjacent control points and a coefficient blending weight in each lens image for each second vertex according to the second texture coordinates in each lens image for each second vertex to generate the first ROI vertex list;
wherein each second data structure further comprises the two indices of two adjacent control points and the coefficient blending weight in each lens image for the corresponding second vertex.

7. The system according to claim 1, further comprising:
a stitching decision device configured to perform second operations comprising:
generating a set of optimal warping coefficients for control points in all the measuring regions according to a set of test warping coefficients and accumulated pixel value differences of both all the measuring regions and the transverse segment;
wherein the projection image comprises at least one overlap region and each overlap region comprises multiple measuring regions; and
wherein the second main vertex list is further related to the set of optimal warping coefficients.

8. The system according to claim 7, further comprising:
a vertex processing device configured to generate a third main vertex list according to the first main vertex list and the set of test warping coefficients, and to generate a second ROI vertex list according to the first ROI vertex list and the set of test warping coefficients in a measuring mode.

9. The system according to claim 8, wherein the image processing apparatus is further configured to measure the accumulated pixel value differences of the measuring regions and the transverse segment according to the multiple lens images, the third main vertex list and the second ROI vertex list in the measuring mode.

10. The system according to claim 7, wherein the second operations further comprise:
determining a selected decision group according to a selected control point; and
determining a temporary warping coefficient for the selected control point according to the set of test warping coefficients and local minimums among the accumulated pixel value differences corresponding to each control point in the selected decision group comprising the selected control point and one or two neighboring control points.

11. The system according to claim 10, wherein the second operation of generating the set of optimal warping coefficients comprises:
when the transverse segment is a single block,
defining the test warping coefficient corresponding to a global minimum among the accumulated pixel value differences of the transverse segment as the temporary warping coefficient of the transverse segment; and
replacing a temporary warping coefficient of a control point inside a first measuring region with the temporary warping coefficient of the transverse segment when the transverse segment either overlaps the first measuring region or occupies more than a half of a second measuring region adjacent to the first measuring region.

12. The system according to claim 10, wherein the second operation of generating the set of optimal warping coefficients comprises:
when the transverse segment is split into multiple sub-segments overlapping multiple measuring regions,
determining a selected decision group according to a selected sub-segment; and
determining a temporary warping coefficient for the selected sub-segment according to the set of test warping coefficients and local minimums among the accumulated pixel value differences corresponding to each sub-segment in the selected decision group comprising the selected sub-segment and one or two neighboring sub-segments.

13. The system according to claim 12, wherein the second operation of generating the set of optimal warping coefficients comprises:
when the transverse segment is split into multiple sub-segments overlapping multiple measuring regions,
after the second operation of determining the temporary warping coefficient, replacing a temporary warping coefficient of a control point inside a first measuring region with the temporary warping coefficient of one of the sub-segments when the one of the sub-segments either overlaps the first measuring region or occupies more than a half of a second measuring region adjacent to the first measuring region.

14. The system according to claim 7, wherein the set of test warping coefficients are associated with an offset that a lens center of the multiple lenses is separated from the camera system center of the multiple-lens camera.

15. An image processing method, applied to an image processing system comprising a multiple-lens camera that captures a X-degree horizontal field of view (FOV) and a Y-degree vertical FOV to generate multiple lens images, the method comprising:
obtaining a first main vertex list according to a correspondence table;
obtaining a first region of interest (ROI) vertex list according to the first main vertex list and a position information of a ROI when the ROI overlaps at least one measuring region inside an overlap region in a projection image; and
generating the projection image according to the multiple lens images and a second main vertex list related to the first main vertex list;

wherein the first main vertex list comprises first vertices forming a polygon mesh modeling the projection image, and wherein the first ROI vertex list comprises second vertices forming a transverse segment associated with an intersection between the ROI and the at least one measuring region, where X<=360, Y<=180.

16. The method according to claim 15, further comprising:
performing at least one of human detection, human face detection and human head detection using a trained model over the projection image to generate the position information of the ROI prior to the step of obtaining the first ROI vertex list.

17. The method according to claim 15, further comprising:
conducting calibration for the first vertices to obtain the correspondence table defining first vertex mapping between the multiple lens images and the projection image prior to the step of obtaining the first main vertex list.

18. The method according to claim 15, wherein the step of obtaining the first ROI vertex list further comprises:
performing interpolation over first texture coordinates of the first vertices adjacent to the second vertices for each lens image based on first and second destination coordinates of the first and the second vertices to generate second texture coordinates in each lens image for each second vertex;
wherein each first vertex has a first data structure and each second vertex has a second data structure, wherein the first data structure comprises the first destination coordinates in the projection image and the first texture coordinates in each lens image for a corresponding first vertex, wherein the second data structure comprises the second destination coordinates in the projection image and the second texture coordinates in each lens image for a corresponding second vertex.

19. The method according to claim 18, wherein the step of obtaining the first ROI vertex list further comprises:
calculating two indices of two adjacent control points and a coefficient blending weight in each lens image for each second vertex according to the second texture coordinates in each lens image for each second vertex;
wherein the second data structure further comprises the two indices of two adjacent control points and the coefficient blending weight in each lens image for the corresponding second vertex.

20. The method according to claim 15, further comprising:
obtaining a set of optimal warping coefficients for control points in all the measuring regions according to a set of test warping coefficients and accumulated pixel value differences of both all the measuring regions and the transverse segment;
wherein the projection image comprises at least one overlap region and each overlap region comprises multiple measuring regions; and
wherein the second main vertex list is further related to the set of optimal warping coefficients.

21. The method according to claim 20, wherein the step of obtaining the set of optimal warping coefficients comprises:
obtaining a third main vertex list according to the first main vertex list and the set of test warping coefficients;
obtaining a second ROI vertex list according to the first ROI vertex list and the set of test warping coefficients; and
measuring the accumulated pixel value differences of all the measuring regions and the transverse segment according to the multiple lens images, the third main vertex list and the second ROI vertex list.

22. The method according to claim 20, wherein the step of obtaining the set of optimal warping coefficients comprises:
determining a selected decision group according to a selected control point; and
determining a temporary warping coefficient for the selected control point according to the set of test warping coefficients and local minimums among the accumulated pixel value differences corresponding to each control point in the selected decision group comprising the selected control point and one or two neighboring control point.

23. The method according to claim 22, wherein the step of obtaining the set of optimal warping coefficients further comprises:
when the transverse segment is a single block,
defining the test warping coefficient corresponding to a global minimum among the accumulated pixel value differences of the transverse segment as the temporary warping coefficient of the transverse segment; and
replacing a temporary warping coefficient of a control point inside a first measuring region with the temporary warping coefficient of the transverse segment when the transverse segment either overlaps the first measuring region or occupies more than a half of a second measuring region adjacent to the first measuring region.

24. The method according to claim 22, wherein the step of obtaining the set of optimal warping coefficients further comprises:
when the transverse segment is split into multiple sub-segments overlapping multiple measuring regions,
determining a selected decision group according to a selected sub-segment; and
determining a temporary warping coefficient for the selected sub-segment according to the set of test warping coefficients and local minimums among the accumulated pixel value differences corresponding to each sub-segment in the selected decision group comprising the selected sub-segment and one or two neighboring sub-segments.

25. The method according to claim 24, wherein the step of obtaining the set of optimal warping coefficients further comprises:
when the transverse segment is split into multiple sub-segments overlapping multiple measuring regions,
after the step of determining the temporary warping coefficient, replacing a temporary warping coefficient of a control point inside a first measuring region with the temporary warping coefficient of one of the sub-segments when the one of the sub-segments either overlaps the first measuring region or occupies more than a half of a second measuring region adjacent to the first measuring region.

26. The method according to claim 20, wherein the set of test warping coefficients are associated with an offset that a lens center of the multiple lenses is separated from the camera system center of the multiple-lens camera.

* * * * *